US012178780B2

(12) United States Patent
Everett

(10) Patent No.: US 12,178,780 B2
(45) Date of Patent: Dec. 31, 2024

(54) PORTABLE COOLING SYSTEMS, DEVICES, AND METHODS

(71) Applicant: Personal Cooling Technologies LLC, Monroe, MI (US)

(72) Inventor: Robert D. Everett, Monroe, MI (US)

(73) Assignee: Personal Cooling Technologies LLC, Monroe, MI (US)

( * ) Notice: Subject to any disclaimer, the term of this patent is extended or adjusted under 35 U.S.C. 154(b) by 492 days.

(21) Appl. No.: 17/602,116

(22) PCT Filed: Apr. 8, 2020

(86) PCT No.: PCT/US2020/027242
§ 371 (c)(1),
(2) Date: Oct. 7, 2021

(87) PCT Pub. No.: WO2020/210340
PCT Pub. Date: Oct. 15, 2020

(65) Prior Publication Data
US 2022/0142864 A1 May 12, 2022

Related U.S. Application Data

(60) Provisional application No. 62/831,395, filed on Apr. 9, 2019.

(51) Int. Cl.
*F25B 21/02* (2006.01)
*A61J 1/16* (2023.01)
(Continued)

(52) U.S. Cl.
CPC ............... *A61J 1/165* (2013.01); *F25B 21/02* (2013.01); *F25B 21/04* (2013.01); *F25D 11/00* (2013.01);
(Continued)

(58) Field of Classification Search
CPC ........... A61J 1/165; F25B 21/00; F25B 21/02; F25B 21/04; F25B 2321/00;
(Continued)

(56) References Cited

U.S. PATENT DOCUMENTS 3,713,302 A 1/1973 Reviel
4,107,934 A 8/1978 Beitner
(Continued)

FOREIGN PATENT DOCUMENTS

CN 2392152 8/2000
CN 201837197 5/2011
(Continued)

OTHER PUBLICATIONS

International Search Report for PCT/US2020/027242 dated Aug. 4, 2020, 3 pages.
(Continued)

*Primary Examiner* — Jonathan Bradford
(74) *Attorney, Agent, or Firm* — Aurora Consulting LLC; Kristen J. Hansen; Ashley Sloat

(57) ABSTRACT

A portable thermoelectric device includes a thermoelectric cooler; a probe configured to measure a temperature inside the device; a compartment fan configured to circulate air in the device, the air having been cooled by a cold side of the thermoelectric cooler; an exhaust fan at least partially positioned in the device and in communication with an external environment, such that the exhaust fan is configured to vent heat from a hot side to the external environment; and a power source configured to receive a range of input voltages. In some embodiments, a first input voltage results in a first temperature differential between an internal environment in the device and the external environment and a second input voltage results in a second temperature differential between the internal environment and the external environment.

22 Claims, 37 Drawing Sheets

(51) Int. Cl.
*F25B 21/04* (2006.01)
*F25D 11/00* (2006.01)

(52) U.S. Cl.
CPC .... *F25D 11/003* (2013.01); *F25B 2321/0212* (2013.01)

(58) Field of Classification Search
CPC .......... F25B 2321/02; F25B 2321/0211; F25B 2321/0212; F25B 2321/023; F25B 2321/025; F25B 2321/0251; F25D 11/00; F25D 11/003
See application file for complete search history.

(56) References Cited

U.S. PATENT DOCUMENTS

| | | | |
|---|---|---|---|
| 4,143,711 A | 3/1979 | Beitner | |
| 4,301,658 A | 11/1981 | Reed | |
| 4,326,383 A | 4/1982 | Reed et al. | |
| 4,328,676 A | 5/1982 | Reed | |
| 4,407,133 A | 10/1983 | Edmonson | |
| 5,319,937 A | 6/1994 | Fritsch et al. | |
| 5,572,873 A | 11/1996 | Lavigne et al. | |
| 7,827,806 B2 | 11/2010 | Tuszkiewicz et al. | |
| 8,061,148 B2 | 11/2011 | Ethier et al. | |
| 8,061,149 B1 * | 11/2011 | Gowans | A61J 1/165 62/3.62 |
| 8,225,616 B2 | 7/2012 | Wilkinson et al. | |
| 8,490,413 B2 | 7/2013 | Blackway et al. | |
| 8,978,392 B2 | 3/2015 | Blackway et al. | |
| 9,267,723 B2 | 2/2016 | Alfille | |
| 9,791,184 B2 | 10/2017 | Novisoff et al. | |
| 9,874,377 B1 | 1/2018 | Ilercil | |
| 10,119,733 B1 | 11/2018 | Ilercil | |
| 2005/0011202 A1 * | 1/2005 | Voute | F25D 31/001 62/62 |
| 2009/0049845 A1 | 2/2009 | Mostravick et al. | |
| 2009/0100843 A1 | 4/2009 | Wilkinson et al. | |
| 2012/0285180 A1 | 11/2012 | Wilkinson et al. | |
| 2012/0312030 A1 | 12/2012 | Lu | |
| 2013/0061604 A1 | 3/2013 | Alfille | |
| 2014/0020406 A1 | 1/2014 | Blackway et al. | |
| 2014/0318153 A1 | 10/2014 | Ilercil | |
| 2015/0204598 A1 * | 7/2015 | Affleck | G01F 23/22 220/560.04 |
| 2016/0003503 A1 | 1/2016 | Novisoff et al. | |
| 2016/0243000 A1 | 8/2016 | Gray | |
| 2017/0056289 A1 | 3/2017 | Tsuno | |
| 2018/0099062 A1 * | 4/2018 | Campalans | F25B 21/04 |
| 2018/0094838 A1 | 8/2018 | Cantor | |
| 2018/0214343 A1 | 8/2018 | Cantor | |
| 2018/0267393 A1 * | 9/2018 | Nomoto | F25B 21/02 |
| 2019/0003757 A1 | 1/2019 | Miros et al. | |

FOREIGN PATENT DOCUMENTS

| | | |
|---|---|---|
| CN | 203454598 | 2/2014 |
| CN | 103900339 A | 7/2014 |
| CN | 108444174 A | 8/2018 |
| EP | 3109574 A4 | 11/2017 |
| WO | 2016011207 A1 | 1/2016 |

OTHER PUBLICATIONS

Supplementary European Search Report dated Oct. 17, 2022 (8 pages).

* cited by examiner

PORTABLE COOLING SYSTEMS, DEVICES, AND METHODS

CROSS-REFERENCE TO RELATED APPLICATIONS

This application claims the priority benefit of U.S. Provisional Patent Application Ser. No. 62/831,395, filed Apr. 9, 2019, the contents of which are herein incorporated by reference in their entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of refrigeration, and more specifically to the field of portable refrigeration. Described herein are portable cooling systems, devices, and methods.

BACKGROUND

Over 5 million U.S. residents take drugs that require refrigeration within a narrow temperature range. Globally, the number is many times that. These drugs typically cost thousands of dollars yearly and are often critical for patient health. Storage of these drugs is key since any significant time outside of a recommended temperature range will reduce their efficacy. Almost half of the top fifty prescribed drugs require refrigeration and all fifty have requirements of being stored below a maximum temperature. Problematically, in two recent studies, less than one in eight patients stored their drugs within the recommended temperature range over a three-month period.

Primary options currently used for drug storage are kitchen, work, and hotel refrigerators. However, refrigerators may be contaminated with mold or other foreign substances and the temperature control is inadequate or provides uneven temperature. In shared spaces, even in the home, the refrigerator may be accessible to other people who may move or damage the drug. Shared refrigerators also do not enable privacy for users requiring the medication. Finally, not all hotel rooms have refrigerators. Beyond primary storage needs, additional problems arise in safely cooling and securing these drugs while traveling (e.g., commuting, business travel, or vacation travel). The current standard method of traveling with refrigerated drugs is to use ice packs. While convenient, they give no indication of the drug's temperature while traveling and only provide a limited time to keep the drugs within the required temperature range. Ice or ice packs can even bring the temperature of the drug below 32° F. which can freeze the drug and reduce its efficacy.

Thus, there is a need for new and more accurate portable cooling devices to address the many weaknesses of the current storage and/or transport options.

SUMMARY

There is a need for new and useful portable cooling systems, devices, and methods. In particular, there is a need for systems, devices, and methods that accurately maintain internal temperature despite fluctuating external temperatures.

One aspect of the present disclosure relates to a portable cooling device. In some embodiments, the device includes: a thermoelectric cooler including a first side and a second side opposite the first side; a probe configured to measure a temperature inside the portable cooling device; a compartment fan configured to circulate air in the portable cooling device, the air having been cooled by the first side of the thermoelectric cooler; an exhaust fan at least partially positioned in the portable cooling device and in communication with an environment external to the portable cooling device, such that the exhaust fan is configured to vent heat from the second side to the external environment; and a power source configured to receive a range of input voltages. In some embodiments, a first input voltage results in a first temperature differential between an internal environment in the portable cooling device and the external environment and a second input voltage results in a second temperature differential between the internal environment and the external environment.

Another aspect of the present disclosure relates to a portable cooling device. In some embodiments, the device includes: a housing comprising: a holder; a thermoelectric cooler including a first side and a second side opposite the first side; a probe configured to measure a temperature inside the holder; a compartment fan positioned in the housing and configured to circulate air in the housing, the air having been cooled by the first side of the thermoelectric cooler; an exhaust fan at least partially positioned in the housing and in communication with an environment external to the housing, such that the exhaust fan is configured to vent heat from the second side to the environment; and a power source configured to receive a range of input voltages. In some embodiments, a first input voltage results in a first temperature differential between an internal environment in the housing and the environment external to the housing and a second input voltage results in a second temperature differential between the internal environment and the environment external to the housing.

Another aspect of the present disclosure relates to a portable cooling device including: an inner housing comprising: a holder, a probe configured to measure a temperature inside the inner housing, and a compartment fan positioned in the inner housing and configured to circulate cooled air in the inner housing; a thermoelectric cooler comprising a first side and a second side opposite the first side, such that the thermoelectric cooler is adjacent to the inner housing; an exhaust fan in communication with an environment external to the portable cooling device, such that the exhaust fan is configured to vent heat from the second side of the thermoelectric cooler to the environment; and a power source configured to receive a range of input voltages to achieve a desired temperature differential between an internal environment in the inner housing and the external environment.

In any of the preceding embodiments, a first input voltage results in a first temperature differential between the internal environment in the inner housing and the environment external to the portable cooling device and a second input voltage results in a second temperature differential between the internal environment and the environment external to the portable cooling device.

In any of the preceding embodiments, the device further includes an outer housing such that inner housing is positioned within the outer housing, and such that insulation is positioned between the outer housing and the inner housing.

In any of the preceding embodiments, the device further includes one or more channels extending axially along a length of the inner housing, between the inner housing and the outer housing, for circulating air from the thermoelectric cooler.

In any of the preceding embodiments, the compartment fan is oriented towards the inner housing, such that cooled air passes through the inner housing and then through the one or more channels.

In any of the preceding embodiments, the compartment fan is oriented away from the inner housing, such that cooled air passes through the one or more channels and then through inner housing.

In any of the preceding embodiments, the exhaust fan is at least partially positioned in the outer housing.

In any of the preceding embodiments, the holder comprises two or more holders. In any of the preceding embodiments, the holder comprises a scale to measure a weight of a receptacle positioned therein.

In any of the preceding embodiments, the device further includes a display configured to indicate the weight of the receptacle positioned in the holder.

In any of the preceding embodiments, the power source comprises a battery, a USB, a cigarette lighter, or a wall outlet.

In any of the preceding embodiments, the device further includes a display configured to indicate the temperature inside the holder.

In any of the preceding embodiments, the first input voltage is less than the second input voltage resulting in the first temperature differential being less than the second temperature differential. In any of the preceding embodiments, the first input voltage is 5 volts and the second input voltage is 6 volts. In any of the preceding embodiments, the first input voltage is different than the second input voltage.

In any of the preceding embodiments, the holder is configured to hold a receptacle comprising a pharmaceutical, a cosmetic, a consumable, or a combination thereof.

In any of the preceding embodiments, the device further includes a second thermoelectric cooler configured to increase the first or second temperature differential.

In any of the preceding embodiments, the thermoelectric cooler functions via convection.

In any of the preceding embodiments, the thermoelectric cooler functions via radiation.

In any of the preceding embodiments, the device further includes a lid that is reversibly couplable to the inner housing and a lock for reversibly locking the portable cooling device.

In any of the preceding embodiments, the device further includes a reserve power source for use when an external power source is unavailable or inconvenient.

In any of the preceding embodiments, the device further includes a first heat sink adjacent to the compartment fan, a second heat sink adjacent to the exhaust fan, and a heat transfer block adjacent to the thermoelectric cooler, the heat transfer block and the thermoelectric cooler being positioned between the compartment fan and the exhaust fan.

In any of the preceding embodiments, the device further includes an external temperature sensor arranged to measure a temperature of the environment external to the inner housing.

In any of the preceding embodiments, the holder is reversibly removable from the inner housing.

In any of the preceding embodiments, the device further includes a processor configured to perform a method comprising: receiving an input voltage and a desired internal environment temperature; measuring a current internal environment temperature in the portable cooling device; calculating a temperature differential between the desired internal environment temperature and the current internal environment temperature; and varying the input voltage or a power to the thermoelectric cooler to achieve the desired internal environment temperature in the portable cooling device.

Another aspect of the present disclosure is directed to a portable cooling device including: a holder; a probe configured to measure a temperature inside the holder; a compartment fan configured to circulate cooled air in or around the holder; a thermoelectric cooler comprising a first side and a second side opposite the first side, such that the thermoelectric cooler is adjacent to the holder; an exhaust fan in communication with an environment external to the portable cooling device, such that the exhaust fan is configured to vent heat from the second side to the environment; and a power source configured to receive a range of input voltages to achieve a desired temperature differential between an internal environment in the portable cooling device and the environment external.

In any of the preceding embodiments, the device further includes an antenna configured to communicatively couple the portable cooling device to a remote computing device.

In any of the preceding embodiments, the device further includes a remote computing device and a display configured to indicate one or more of: a connectivity status between the portable cooling device and the remote computing device, a power status of the portable cooling device, and a temperature status of the holder or in the holder.

In any of the preceding embodiments, the antenna is configured as a transceiver.

In any of the preceding embodiments, the device further includes the remote computing device, such that the remote computing device comprises a server, a mobile computing device, a wearable device, a laptop, or a desktop computer.

In any of the preceding embodiments, the temperature measured by the probe is transmitted to the remote computing device.

In any of the preceding embodiments, the transmitted temperatures are transmitted and stored overtime to maintain a history of temperatures.

In any of the preceding embodiments, the device further includes a scale arranged to measure a weight of one or more receptacles positioned in the holder, such that the weight is transmitted to the remote computing device.

In any of the preceding embodiments, the device further includes an inner housing at least partially enclosing the probe, the compartment fan, the thermoelectric cooler, and the exhaust fan.

In any of the preceding embodiments, the device further includes an outer housing disposed around the inner housing, wherein insulation is positioned between the inner housing and the outer housing.

In any of the preceding embodiments, the exhaust fan is at least partially positioned in the outer housing.

In any of the preceding embodiments, the device further includes one or more channels extending axially along a length of the inner housing, between the inner housing and the outer housing, for circulating air from the thermoelectric cooler.

In any of the preceding embodiments, the compartment fan is oriented towards the inner housing, such that cooled air passes through the inner housing and then through the one or more channels.

In any of the preceding embodiments, the compartment fan is oriented away from the inner housing, such that cooled air passes through the one or more channels and then through inner housing.

In any of the preceding embodiments, the device further includes a base extending along an axially length of the portable cooling device, such that the base is positioned to contact a surface on which the portable cooling device rests.

In any of the preceding embodiments, a first input voltage results in a first temperature differential between the internal environment in the portable cooling device and the environment external to the portable cooling device and a second input voltage results in a second temperature differential between the internal environment and the environment external to the portable cooling device. In any of the preceding embodiments, the first input voltage is less than the second input voltage resulting in the first temperature differential being less than the second temperature differential. In any of the preceding embodiments, the first input voltage is 5 volts and the second input voltage is 6 volts. In any of the preceding embodiments, the first input voltage is different than the second input voltage.

In any of the preceding embodiments, the holder is configured to hold a receptacle comprising a pharmaceutical, a cosmetic, a consumable, or a combination thereof.

In any of the preceding embodiments, the device further includes a lid that is reversibly couplable to the inner housing and a lock for reversibly locking the portable cooling device.

In any of the preceding embodiments, the device further includes a reserve power source for use when an external power source is unavailable or inconvenient.

In any of the preceding embodiments, the device further includes a first heat sink adjacent to the compartment fan, a second heat sink adjacent to the exhaust fan, and a heat transfer block adjacent to the thermoelectric cooler, the heat transfer block and the thermoelectric cooler being positioned between the compartment fan and the exhaust fan.

In any of the preceding embodiments, the device further includes an external temperature sensor arranged to measure a temperature of the environment external to the portable cooling device.

In any of the preceding embodiments, the holder is reversibly removable from the inner housing.

In any of the preceding embodiments, the device further includes a processor configured to perform a method comprising: receiving an input voltage and a desired internal environment temperature; measuring a current internal environment temperature in the portable cooling device; calculating a temperature differential between the desired internal environment temperature and the current internal environment temperature; and varying the input voltage or a power to the thermoelectric cooler to achieve the desired internal environment temperature in the portable cooling device.

Another aspect of the present disclosure includes a portable cooling device with no moving parts, including: a thermoelectric cooler comprising a first side and a second side, such that the first side is configured to cool air inside the portable cooling device, and the second side is configured as a housing, comprising: a holder, a probe configured to measure a temperature inside the holder, and a power source configured to receive a range of input voltages, wherein a first input voltage results in a first temperature differential between an internal environment in the housing and the environment external to the housing and a second input voltage results in a second temperature differential between the internal environment and the environment external to the housing.

In any of the preceding embodiments, the first side comprises a cool side and the second side comprises a hot side with a heat sink.

In any of the preceding embodiments, the first side comprises a cool side with a heat sink and the second side comprises a hot side with a heat sink.

In any of the preceding embodiments, the device further includes an antenna configured to communicatively couple the portable cooling device to a remote computing device.

In any of the preceding embodiments, the device further includes the remote computing device and a display configured to indicate one or more of: a connectivity status between the portable cooling device and the remote computing device, a power status of the portable cooling device, and a temperature status of the holder or in the holder.

In any of the preceding embodiments, the antenna is configured as a transceiver.

In any of the preceding embodiments, the device further includes the remote computing device, such that the remote computing device comprises a server, a mobile computing device, a wearable device, a laptop, or a desktop computer.

In any of the preceding embodiments, the temperature measured by the probe is transmitted to the remote computing device.

In any of the preceding embodiments, the transmitted temperatures are transmitted and stored overtime to maintain a history of temperatures.

In any of the preceding embodiments, the device further includes a scale arranged to measure a weight of one or more receptacles positioned in the holder, such that the weight is transmitted to the remote computing device.

In any of the preceding embodiments, the device further includes a base extending along an axially length of the portable cooling device, such that the base is positioned to contact a surface on which the portable cooling device rests.

In any of the preceding embodiments, the first input voltage is less than the second input voltage resulting in the first temperature differential being less than the second temperature differential. In any of the preceding embodiments, the first input voltage is 5 volts and the second input voltage is 6 volts. In any of the preceding embodiments, the first input voltage is different than the second input voltage.

In any of the preceding embodiments, the holder is configured to hold a receptacle comprising a pharmaceutical, a cosmetic, a consumable, or a combination thereof.

In any of the preceding embodiments, the device further includes a lid that is reversibly couplable to the housing and a lock for reversibly locking the portable cooling device.

In any of the preceding embodiments, the device further includes a reserve power source for use when an external power source is unavailable or inconvenient.

In any of the preceding embodiments, the device further includes an external temperature sensor arranged to measure a temperature of the environment external to the portable cooling device.

In any of the preceding embodiments, the holder is reversibly removable from the inner housing.

In any of the preceding embodiments, the device further includes a processor configured to perform a method comprising: receiving an input voltage and a desired internal environment temperature; measuring a current internal environment temperature in the portable cooling device; calculating a temperature differential between the desired internal environment temperature and the current internal environment temperature; and varying the input voltage or a power to the thermoelectric cooler to achieve the desired internal environment temperature in the portable cooling device.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
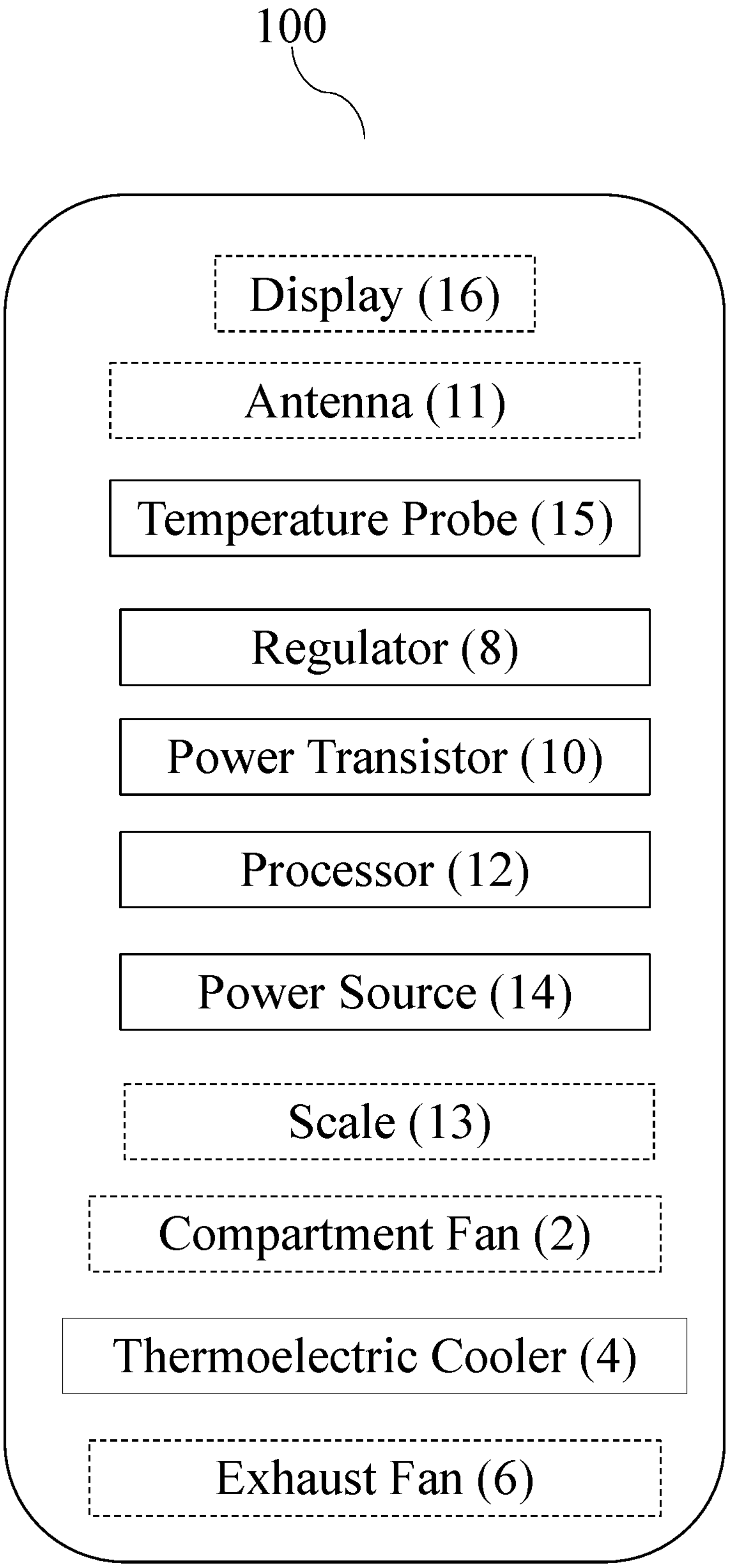
FIG. 1 shows a schematic of one embodiment of a portable cooling device.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

There are portable coolers available from several companies. These coolers were tested for their ability to reach and maintain a target temperature, and all were found to be ineffective. Their quoted specifications indicate that they can reach the top of the recommended range of 8° C. only if the ambient temperature is 20° C. (68° F.) or below. Further, the temperature distribution inside the coolers was uneven. They all reported a temperature within the required range, but all were considerably above the reported range when they were tested with an accurate wireless thermometer. The most accurate unit displayed an internal temperature 10° F. lower than the actual temperature. These findings reveal that currently available portable cooling devices are inaccurate at best for the one function that is absolutely critical—maintaining temperature at a desired target temperature.

As such, the systems and devices described herein are configured to cool accurately and precisely a receptacle. In some embodiments, the receptacle (e.g., vial, syringe, bottle, compact, blister pack, tube, etc.) may comprise a drug, therapeutic, cosmetic, consumable, or other fluid or liquid contained within the receptacle.

In some embodiments, the systems and devices described herein are configured to heat accurately and precisely a receptacle. In some embodiments, the receptacle (e.g., vial, syringe, bottle, compact, blister pack, tube, etc.) may comprise a drug, therapeutic, cosmetic, consumable, or other fluid or liquid contained within the receptacle.

In general, the systems and devices described herein are portable. For example, the systems and devices described herein are configured to be transported from a first location to a second location, while maintaining temperature during transport. The systems and devices described herein are portable in that the systems and devices can be set up or positioned anywhere—in a car, on a bathroom sink, in a hotel room, etc. The systems and devices described herein are also self-contained such that the cooling system may be positioned on the floor, on a desk, in a fridge, in a car, in a carry-on bag (e.g., for flying), in a bag or container that allows air exchange, etc.

In general, the systems, devices, and methods described herein are configured to be used and/or performed by a user. The user may be a patient, athlete, doctor, physician, therapist, parent, individual with a chronic illness or disorder, cosmetologist, or any other individual requiring a refrigeration system or device that is portable.

Turning now to FIG. 1, which shows a schematic of one embodiment of a portable cooling device 100. While the components of FIG. 1 are shown in a particular order or stacked orientation, one of skill in the art will appreciate that the embodiments described herein shall not be limited to this particular order and that various embodiments may significantly depart from the overall structure or order of components of the portable cooling device shown in any of the figures described herein. The portable cooling devices described herein are unconstrained by appearance or housing. For example, the device 100 of FIG. 1 includes a compartment fan 2, a thermoelectric cooler 4, an exhaust fan 6, a regulator 8, a power transistor 10, a processor 12, a power source 14, a temperature probe 15, and an optional display 16, each of which will be described in turn below. The devices shown and described herein function to cool the compartment defined by the body or housing. Alternatively, the devices shown and described herein may function to heat the compartment defined by the body or housing, for example simply by reversing the voltage on the thermoelectric device. In some embodiments, the housing comprises one or more holders and/or receptacles contained therein.

Figure 2:
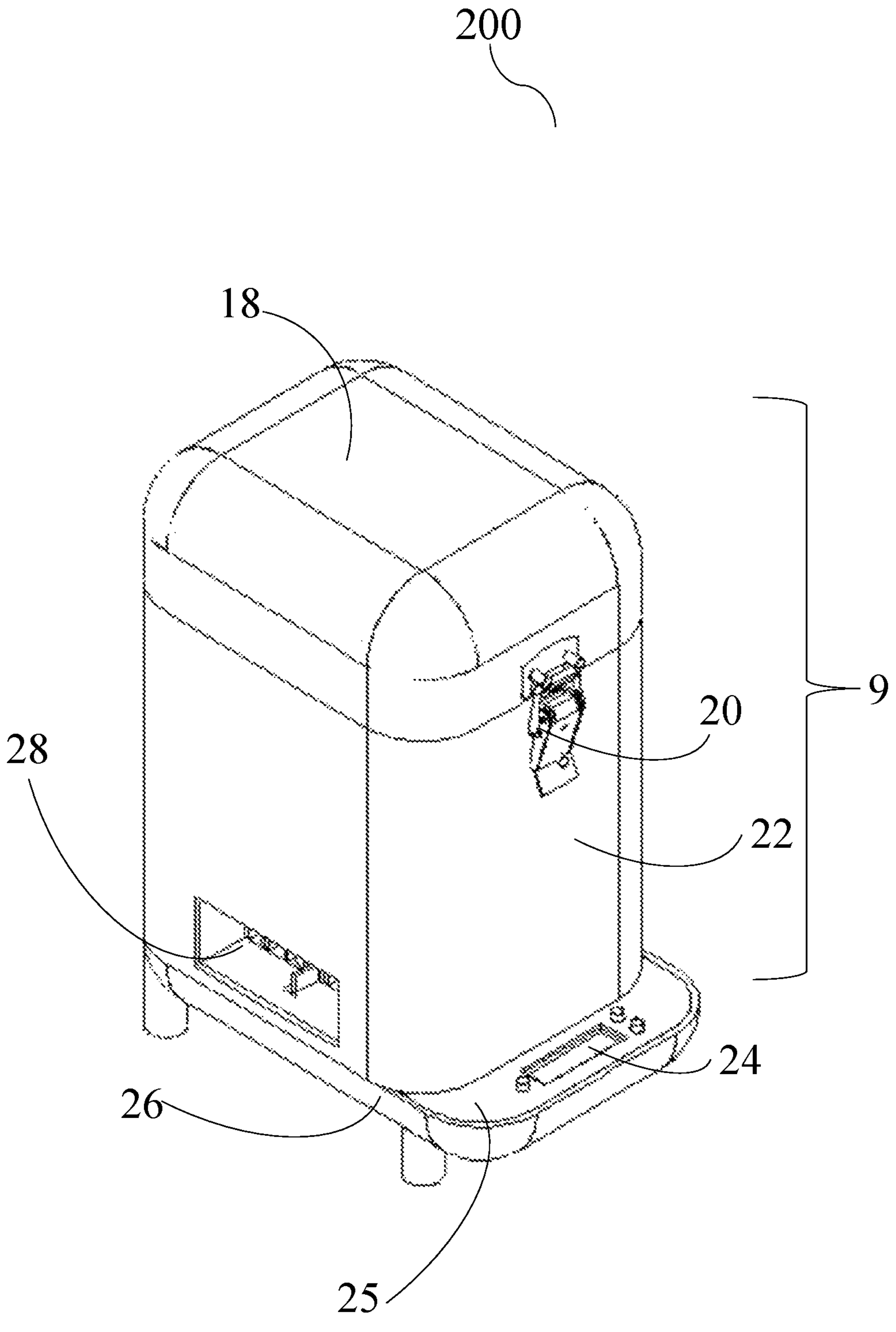
FIG. 2 shows an embodiment of a portable cooling device.
Figure 8:
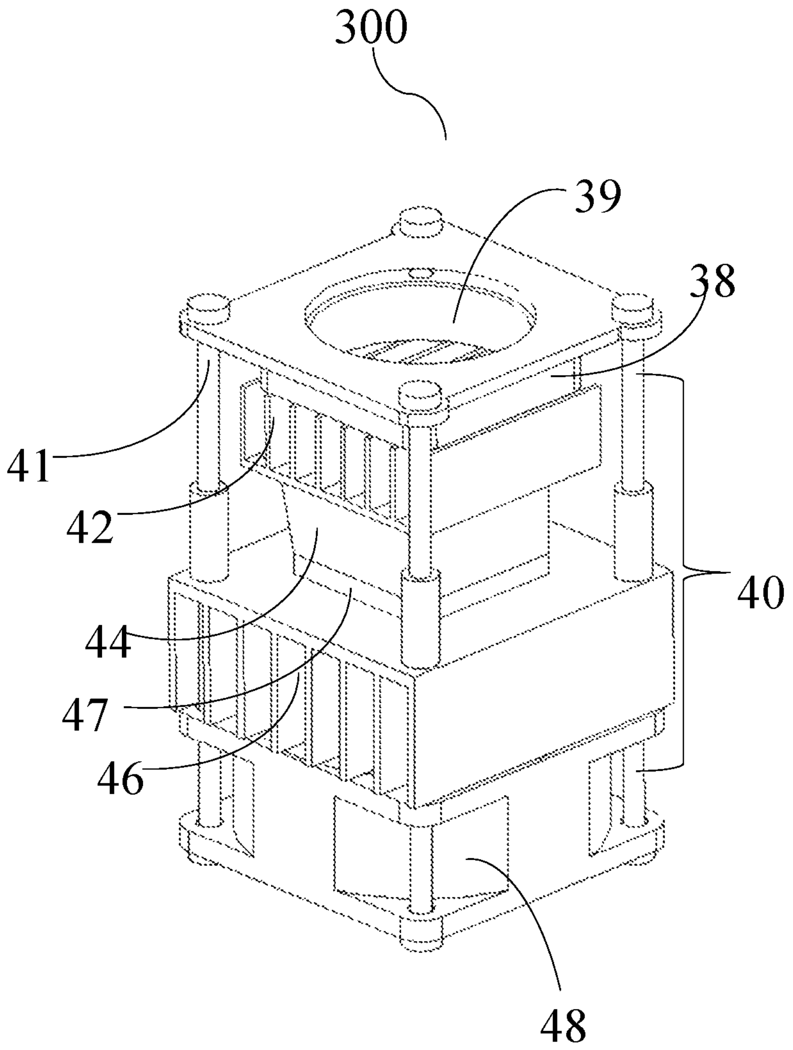
FIG. 8 shows a perspective view of a core of the device of FIG. 2.

In some embodiments, as shown in FIG. 1 and FIG. 8, a portable cooling device 100 includes a compartment fan 2 and an exhaust fan 6. The compartment fan 2 functions to distribute or circulate cooled air in the portable cooling device 100 or in a housing of the portable cooling device 100. Warm air will tend to rise towards the lid of the device and the cool air will tend to settle near the thermoelectric cooler 4. As such, holder(s) and/or receptacle(s) in the housing may be subjected to uneven temperatures in the absence of compartment fan 2. As shown in FIG. 17E, compartment fan 1702 may be oriented, as shown by arrow 1729*a*, towards inner housing 1721, such that compartment fan 1702 blows cooled air into the inner housing 1721 through to one or more channels 1724, as shown by airflow arrow 1727*a*, and then down to heat sink 1704 and compartment fan 1702. Alternatively, as shown in FIG. 17F, compartment fan 1702 may be oriented, as shown by arrow 1729*b*, away from inner housing 1721 or toward exhaust fan, such that compartment fan 1702 blows cooled air into one or more channels 1724 through to the inner housing 1721, as shown by airflow arrow 1727*b*. The exhaust fan 6 functions to expel or exhaust excess heat from the thermoelectric cooler 4 through an aperture or vent 28 (e.g., as shown in FIG. 2) in the portable cooling device or a housing of the portable cooling device, as described elsewhere herein. In some embodiments, compartment fan 2 and/or exhaust fan 6 include two or more blades. The blades may have a symmetric or asymmetric distribution and/or shape. In some embodiments, an asymmetric distribution and/or shape significantly reduces a noise level of the fan or tunes a noise level of the fan to a preferable intensity.

In some embodiments, a portable cooling device includes one fan with multiple functions. In. some such embodiments, the compartment fan 2 functions to circulate cooled air and exhaust heated air from the thermoelectric cooler; in other embodiments, the exhaust fan 6 functions to circulate cooled air and exhaust heated air from the thermoelectric cooler. In some embodiments, as described elsewhere herein, a portable cooling device does not include any fans (i.e., no moving parts).

In some embodiments, as shown in FIG. 1, a portable cooling device 100 includes a thermoelectric cooler 4. The thermoelectric cooler 4 functions to cool air within the portable cooling device or a housing of the portable cooling device to cool one or more receptacles contained within the portable cooling device, housing, and/or one or more holders. In some embodiments, the thermoelectric cooler 4 includes a first side or a cold side (optionally with a heat sink) and a second side or a hot side with a heat sink. In some embodiments, the first side is opposite the second side; in other embodiments, the first side is adjacent or proximate to the second side (e.g., first side is angled relative to the second side, for example about 45 to about 100 degrees; about 70 degrees to about 90 degrees, etc.). Various thermoelectric elements (e.g., semiconductor elements, n-type elements, p-type elements, etc.) are disposed between the cold side and hot side. The second side or hot side of the thermoelectric cooler 4 may be coupled to or communicatively coupled to an exhaust fan 6 to dispel heat from the heat sink. The thermoelectric cooler 4 further includes a conductor metal, for example graphene, copper, aluminum, or the like. The conductor metal flanks thermoelectric elements (e.g., semiconductor elements, n-type elements, p-type elements, etc.). The conductor metal isolates heat by transferring heat from either the cold or hot side to a heat sink that then transfers the heat to the air (on the hot side) or from the air (on the cold side). One of skill in the art will readily appreciate and understand the structure and functioning of thermoelectric coolers (See, e.g., He et al. "Thermoelectric Devices: A Review of Devices, Architectures, and Contact Optimization" *Adv. Mater. Technol.* 2018, 3, 1700256, the disclosure of which is herein incorporated by reference in its entirety.)

In some embodiments, a portable cooling device 100 includes a second thermoelectric cooler to increase a cooling capacity of the first thermoelectric cooler 4. For example, including a second thermoelectric cooler in series may increase an available temperature differential between an external environment and an internal environment, whereas a second thermoelectric cooler in parallel doubles an amount of heat that can be removed from the internal environment in the portable cooler. The first and second thermoelectric coolers may function in tandem, for example in a stacked configuration or adjacent to each other.

In some embodiments, the thermoelectric cooler 4 is replaced with or supplemented with a compressor or other cooling mechanism known to one of skill in the art.

In some embodiments, as shown in FIG. 1, a portable cooling device 100 includes a regulator 8. The regulator 8 functions to maintain a clean and constant voltage level regardless of the voltage supplied to the unit. The regulator 8 may comprise an electromechanical regulator, an electronic voltage regulator, an automatic voltage regulator, or any other regulator known in the art. In some embodiments, the regulator further includes internal current limiting, thermal shutdown, and/or safe area compensation.

In some embodiments, as shown in FIG. 1, a portable cooling device 100 includes a power transistor 10 (e.g., MOSFET, NPN transistor, etc.). The power transistor 10 functions to supply power to the thermoelectric cooler 4 and allow that power to be turned off and on.

In some embodiments, as shown in FIG. 1, a portable cooling device 100 includes a processor 12. The processor 12 may be a general purpose microprocessor, a digital signal processor (DSP), a field programmable gate array (FPGA), an application specific integrated circuit (ASIC), or other programmable logic device, or other discrete computer-executable components designed to perform the functions described herein. The processor may also be formed of a combination of computing devices, for example, a DSP and a microprocessor, a plurality of microprocessors, one or more microprocessors in conjunction with a DSP core, or any other suitable configuration.

In some embodiments, the processor 12 is coupled, via one or more buses, to a memory in order to read information from, and optionally write information to, the memory. The memory may be any suitable computer-readable medium that stores computer-readable instructions for execution by a processor 12. For example, the computer-readable medium may include one or more of RAM, ROM, flash memory, EEPROM, a hard disk drive, a solid state drive, or any other suitable device. In some embodiments, the computer-readable instructions include software stored in a non-transitory format. The software may be programmed into the memory or downloaded as an application onto the memory. The software may include instructions for running an operating system and/or one or more programs or applications. When executed by the processor 12, the programs or applications may cause the processor 12 to perform a method. Some such methods are described in more detail elsewhere herein. In some embodiments, the processor 12 couples with an antenna to transmit data including temperature data and/or weight data to a computing device, as described elsewhere herein.

In some embodiments, as shown in FIG. 1, a portable cooling device 100 includes a temperature probe 15 (or one or more temperature probes). In some embodiments, temperature probe 15 is coupled to a bottom of a wire mesh that one or more receptacles are contained therein or coupled to a portion or a surface of a holder contained within the portable cooling device 100. In some embodiments, a temperature probe 15 may be positioned between a compartment fan 1702 and a bottom portion 1725 of an inner chamber 1721 of the device 1700 (as shown in FIG. 17D). As will be appreciated, the temperature probe 15 may be positioned anywhere within or around an inner housing, within or around an outer housing, or within the portable cooling device. For example, the temperature probe may measure a cold side of a thermoelectric cooler or a region or space adjacent to the cold side of a thermoelectric cooler. The temperature probe 15 functions to measure a temperature of an internal environment of the portable cooling device 100. The internal environment includes a temperature of an internal compartment, a holder, and/or one or more receptacles positioned in the internal compartment or holder. In some embodiments, the internal environment includes an inner chamber or cooling chamber of the portable cooling device. The temperature probe 15 may include a negative temperature coefficient thermistor, a resistance temperature detector, a thermocouple, or a semiconductor-based sensor. The temperature measured by temperature probe 15 is communicated to processor 12 and optionally displayed by optional display 16. In some embodiments, a temperature measured by temperature probe 15 is communicated to a remote computing device, as described elsewhere herein.

In some embodiments, as shown in FIG. 1, a portable cooling device 100 includes a power source 14. The power source 14 functions to provide energy or power to one or more components (e.g., thermoelectric cooler, fans, display, etc.) of the portable cooling device 100. In some embodiments, the power source comprises a battery, a USB, a cigarette lighter receptacle, or a wall outlet. In other embodiments, the power source 14 includes one or more solar panels. In some embodiments, the portable cooling device 100 is configured to receive power from a variety of power sources, such that an input voltage into the portable cooling device 100 varies with the power source 14. In some such embodiments, a cooling capacity of the portable cooling device 100 is dependent on the power source used, more specifically the input voltage from the power source 14. In some embodiments, as the input voltage increases, a temperature differential between an internal compartment of the portable cooling device 100 and the external environment increases. In some embodiments, a personal cooling device further includes a reserve power source, for example, a second battery or backup battery or rechargeable battery for use when an external power source is unavailable.

Figure 11:
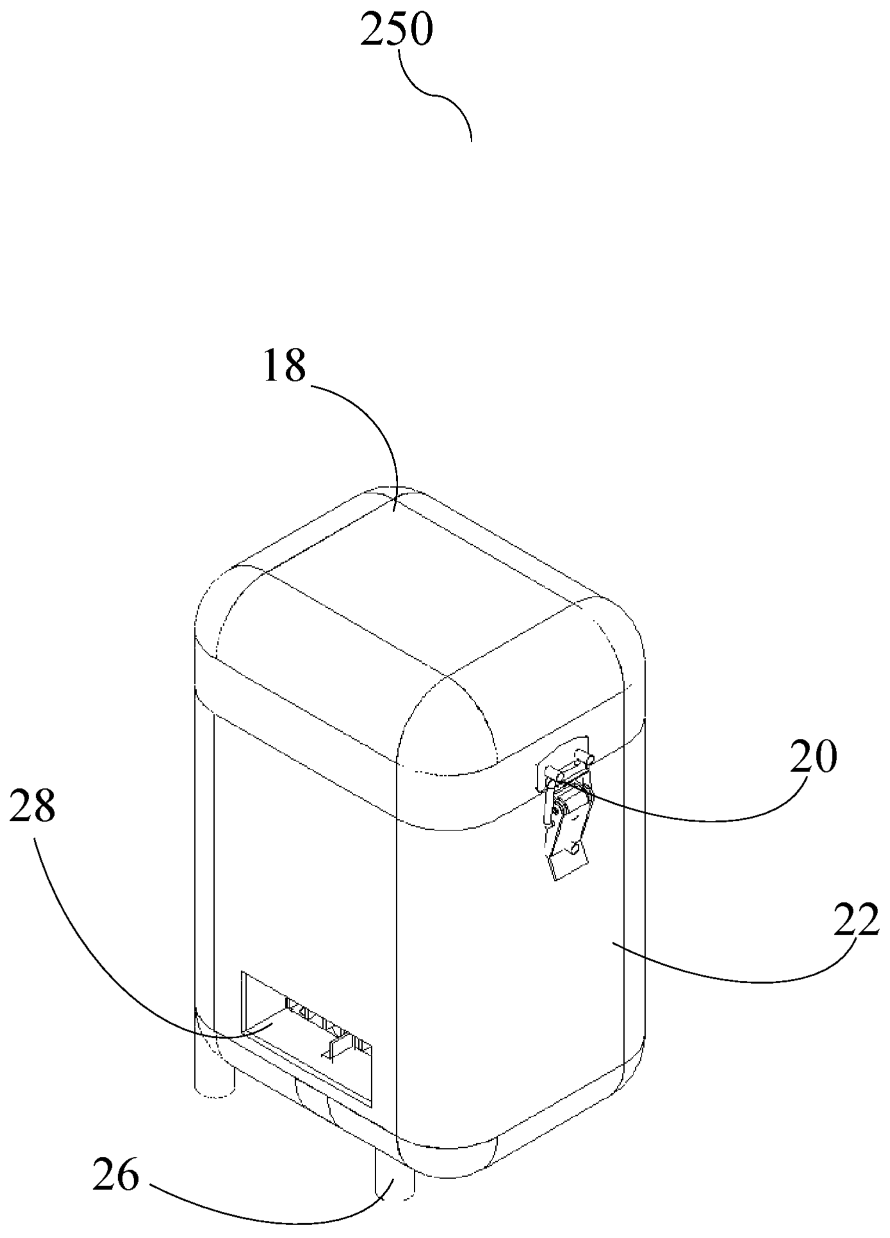
FIG. 11 shows another embodiment of a portable cooling device.

In some embodiments, as shown in FIGS. 1-2, a portable cooling device optionally includes a display 16 with or without touch responsive capabilities (e.g., Thin Film Transistor liquid crystal display (LCD), in-place switching LCD, resistive touchscreen LCD, capacitive touchscreen LCD, organic light emitting diode (LED), Active-Matrix organic LED (AMOLED), Super AMOLED, Retina display, Haptic/Tactile touchscreen, or Gorilla Glass). The display 16 is configured to display a temperature of an internal compartment of the portable cooling device 100, a holder in the portable cooling device 100, and/or a receptacle contained in the portable cooling device 100 or held by a holder in the portable cooling device 100. FIG. 11 shows an embodiment of a portable cooling device 250 that lacks a display. In some such embodiments, a processor communicatively coupled to the temperature probe may communicate a temperature of a compartment (e.g., storage compartment, cooling compartment, etc.) in the portable cooling device and/or one or more receptacles therein to a remote computing device (e.g., server, computing device, etc.), as shown in FIGS. 12-13.

Figure 12:
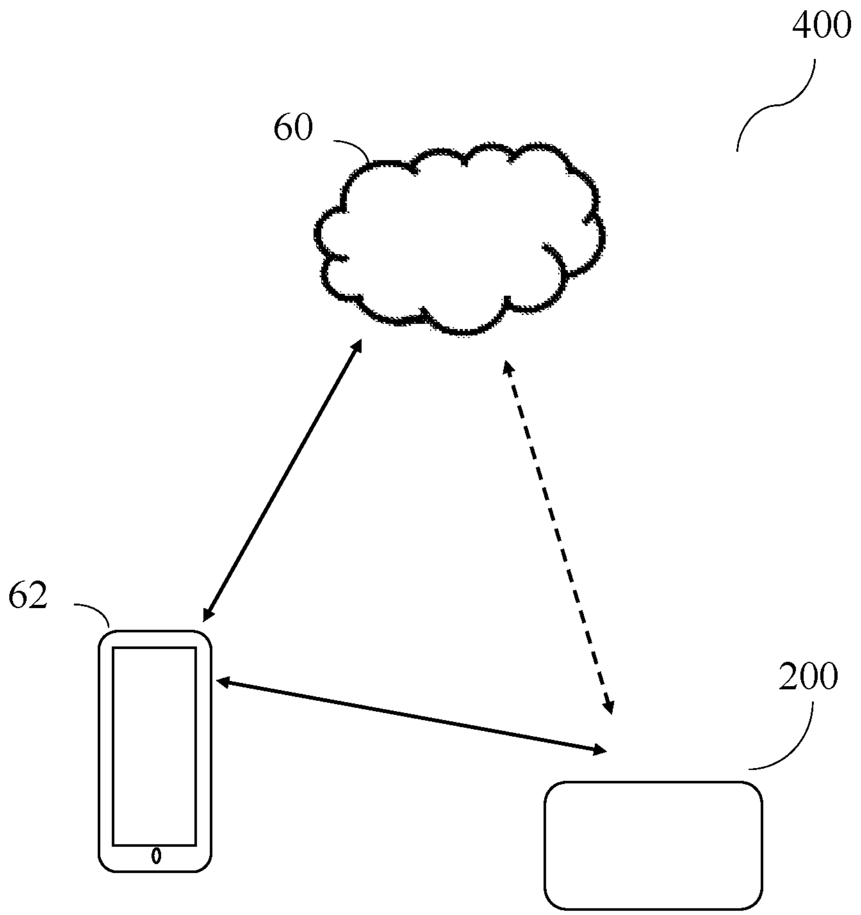
FIG. 12 shows another embodiment of a portable cooling device communicatively coupled to one or more remote computing devices.

FIG. 12 shows an embodiment 400 of a portable cooling device 200 that is communicatively coupled to one or more computing devices 60, 62. For example, the computing device may include a remote computing device 60, 62. Non-limiting examples of remote computing devices include: a server 60, a mobile computing device 62, a wearable device, a laptop, a notebook, a netbook, a desktop computer, or the like. There may be one-way or two-way communication between the portable cooling device 200 and computing device 62, the portable cooling device 200 and the server 60, and/or the computing device 62 and the server 60. The portable cooling device 200, computing device 62, and/or server 60 may communicate wirelessly using Bluetooth, low energy Bluetooth, near-field communication, infrared, WLAN, Wi-Fi, CDMA, LTE, other cellular protocol, other radiofrequency, or another wireless protocol. Additionally or alternatively, sending or transmitting information between the portable cooling device 200, the computing device 62, and the server 60 may occur via a wired connection such as IEEE 1394, Thunderbolt, Lightning, DVI, HDMI, Serial, Universal Serial Bus, Parallel, Ethernet, Coaxial, VGA, or P S/2.

Figure 13:
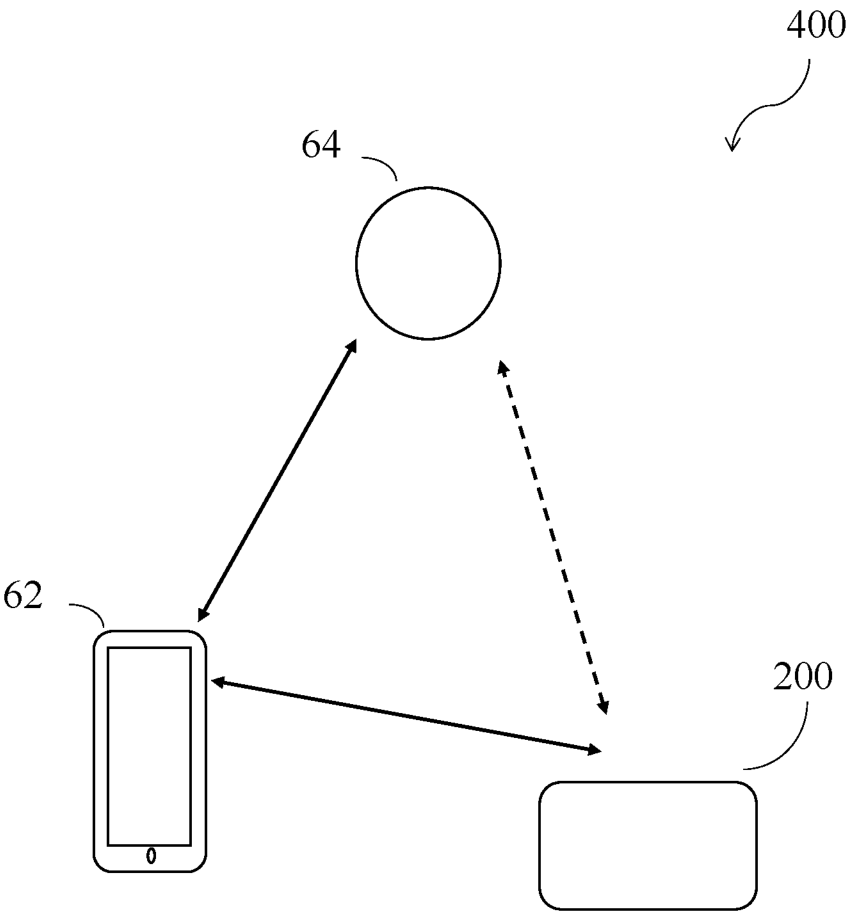
FIG. 13 shows another embodiment of a portable cooling device communicatively coupled to computing device and/or a temperature probe.

In some embodiments, as shown in FIG. 13, a portable cooling device 200 includes an external temperature probe 64, for example on a housing or other surface of the portable cooling device 200. The external temperature probe 64 is configured to measure a temperature of an external environment. In other embodiments, the portable cooling device 200 is communicatively coupled to an external temperature probe 64 configured to measure a temperature of the external environment. Alternatively, or additionally, the external temperature probe 64 may be communicatively coupled to a computing device 62 or integrated into the computing device 62. Such external environment temperature measurements may be used to calculate a temperature differential between an internal environment in the portable cooling device and the external environment. There may be one-way or two-way communication between the portable cooling device 200 and computing device 62, the portable cooling device 200 and the external temperature probe 64, and/or the computing device 62 and the external temperature probe 64. The portable cooling device 200, computing device 62, and/or temperature probe 64 may communicate wirelessly using Bluetooth, low energy Bluetooth, near-field communication, infrared, WLAN, Wi-Fi, CDMA, LTE, other cellular protocol, other radiofrequency, or another wireless protocol.

In some embodiments, such as the embodiment shown in FIGS. 1 and 12, a portable cooling device 100, 200 optionally includes an antenna 11. The antenna 11 may be located on the circuit board or in or on the housing or in or on a surface of the portable cooling device. The antenna 11 may function as a receiver, a transmitter, or a transceiver (i.e., both transmitter and receiver). The receiver receives and demodulates data received over a communication network. The transmitter prepares data according to one or more network standards and transmits data over a communication network. In some embodiments, a transceiver acts as both a receiver and a transmitter for bi-directional wireless communication. Alternatively, or additionally, in some embodiments, a databus is included on the circuit board so that data can be sent from, or received by, the portable cooling device via a wired connection.

Further, in any of the portable cooling devices described herein, a display on the portable cooling device or a computing device communicatively coupled to the portable cooling device may be configured to indicate a connectivity status between the portable cooling device and the computing device (e.g., remote computing device, mobile computing device, server, etc.). Alternatively, or additionally, the portable cooling device may include a user interface such as a light display (i.e., one or more LEDs), a speaker that sounds a signal, or a haptic output to indicate a connectivity status, a temperature status, a power status, etc.

In some embodiments, the portable cooling device 100 of FIG. 1 optionally includes a scale 13. The scale 13 may be positioned in the housing, for example underneath, below, or adjacent to a holder, such that the weight of one or more receptacles in the holder may be measured. In some such embodiments, the display 16 is configured to display a measured weight of the one or more receptacles or a combined weight of a holder and one or more receptacles therein. Alternatively, or additionally, the weight may be transmitted to a remote computing device, as described elsewhere herein.

In some embodiments, the portable cooling device described herein is configured to contain, hold, or otherwise, house a holder. The holder may comprise two or more holders. In some embodiments, the holder is integrally formed in the housing, for example an inner chamber of the housing; in other embodiments, the holder is removably coupled to the housing, as shown and described elsewhere herein, for example to allow holders of different shapes and/or sizes and/or depths and/or configurations to be positioned in the housing.

FIGS. 2-9 show various views and features of a portable cooling device 200 in accordance with the present invention. In some embodiments, a portable cooling device 200 may include an external lid 18, an internal lid 21, a securing or locking mechanism 20, an outer housing 22, a display 24, a base 26, and an aperture 28 defined by the outer housing 22, each of which will be described in turn.

As shown in FIGS. 2-7A, a portable cooling device 200 may include a housing 9. Housing 9 comprises one or more of outer housing 22, an external lid 18, an internal lid 21, base 26, air flow compartment or one or more channels 49, and inner housing 50. The housing 9 functions to contain one or more components described herein and/or separate an internal environment in the portable cooling device from an external environment outside of the portable cooling device.

Figure 3A:
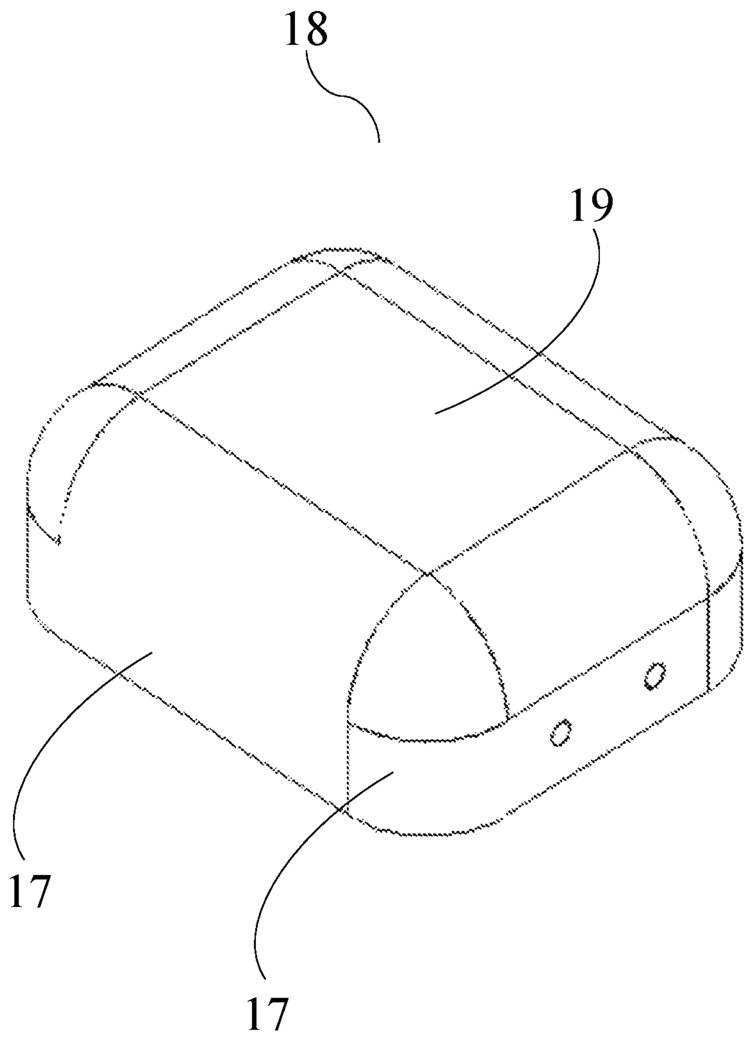
FIGS. 3A-3B show a top and a bottom perspective view, respectively, of an external component of a lid of the device of FIG. 2.
Figure 3B:
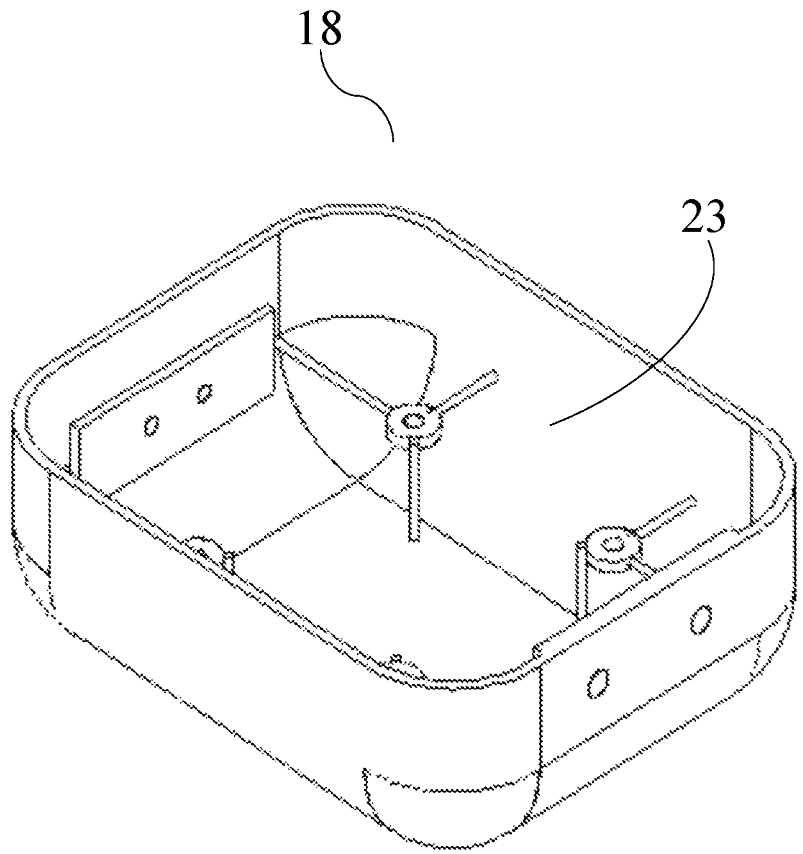

As shown in FIGS. 2-3B, a portable cooling device 200 may include external lid 18. External lid 18 is removably coupled to the outer housing 22 via a coupling mechanism, for example, a hinge. External lid 18 is further configured to couple to the outer housing 22 via a securing mechanism 20 (e.g., latch, lock, threaded screws, retaining washer, etc.) in order to separate an internal environment in the portable cooling device 200 or defined by a housing 9 from an external environment external to or surrounding the portable cooling device 200. As shown in FIGS. 3A-3B, external lid 18 includes a lid surface 19 coupled to a plurality of sidewalls 17, which together define external lid 18. Securing mechanism 20 is attached to one of the plurality of sidewalls 17 of external lid 18 and to outer housing 22. When external lid 18 is positioned proximally or secured to outer housing 22 by securing mechanism 20, the securing mechanism 20 is configured to seal and couple external lid 18 to outer housing 22.

Figure 4A:
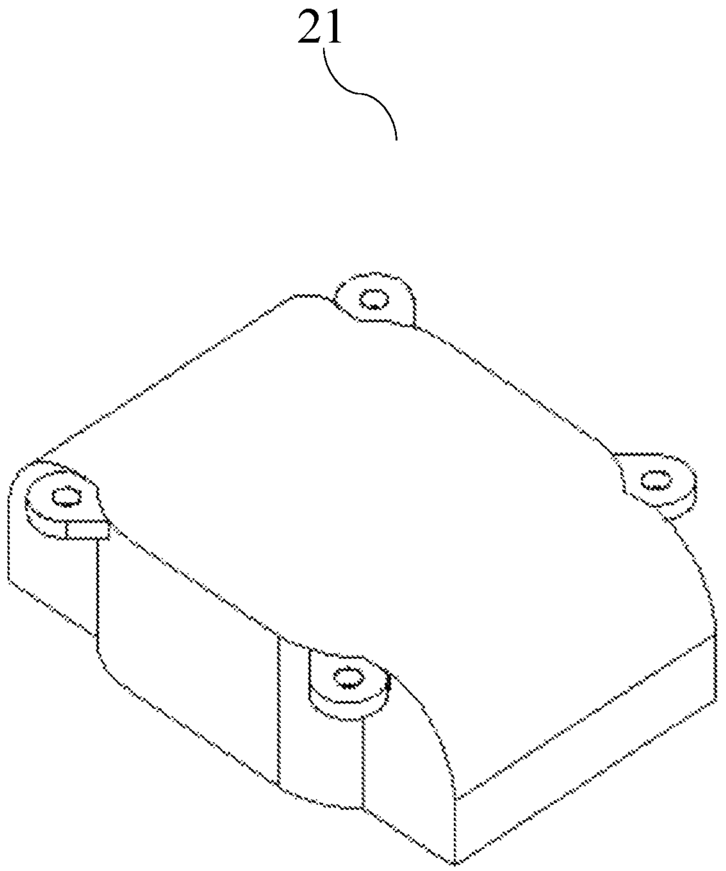
FIGS. 4A-4B show a top and a bottom perspective view, respectively, of an internal component of a lid of the device of FIG. 2.
Figure 4B:
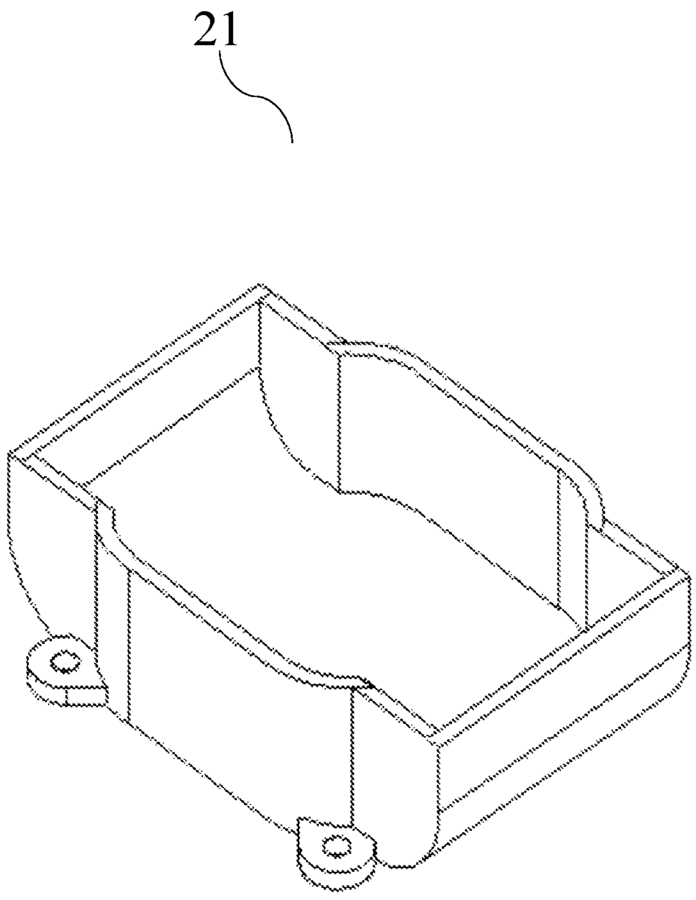

FIGS. 4A-4B show a top and bottom view, respectively, of an internal component of the lid 21. The internal component of the lid 21 couples to external lid 18 and functions to provide insulation to an inner housing 50 where one or more receptacles are stored and/or a thermoelectric cooler positioned in the inner housing 50. External lid 18 is coupled to internal lid 21 with volume 23, shown in FIG. 3B, defined by external lid 18 and internal lid 21. Volume 23 defined by the coupling of external lid 18 and internal lid 21 is configured to receive insulation, for example foam, fiberglass, cellulose, or the like.

Figure 5A:
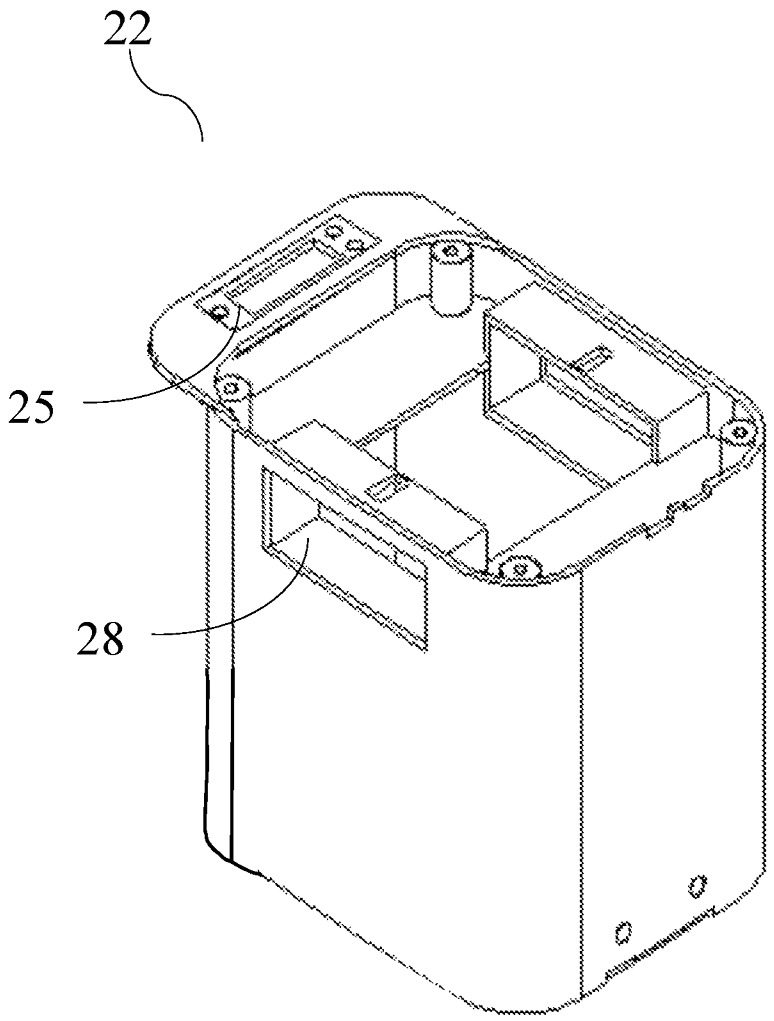
FIGS. 5A-5B show a top and a bottom perspective view, respectively, of an outer housing of the device of FIG. 2.
Figure 5B:
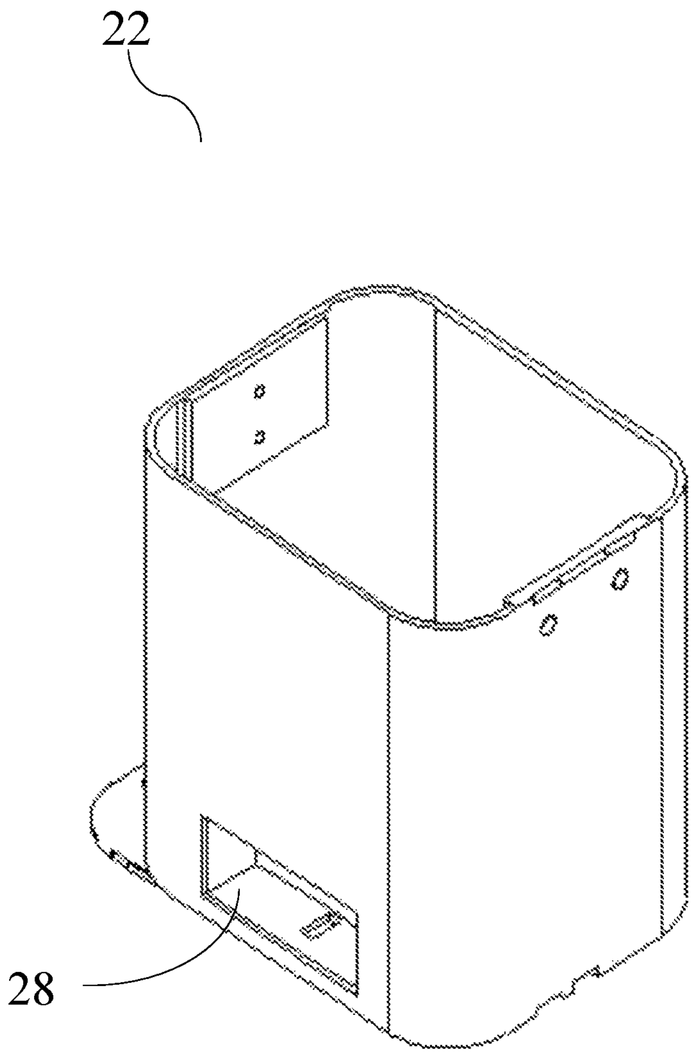

FIGS. 2 and 5A-5B show various views of an outer housing 22. The outer housing 22 functions as another insulation layer to the inner housing 50 and thermoelectric cooler, a protective layer to the inner housing 50, and/or to provide an aperture for venting the thermoelectric cooler. As will be appreciated by one of skill in the art, the outer housing may have any shape: cylindrical, cuboidal, rectangular prism, trapezoidal prism, etc. As shown in FIGS. 2 and 5B, outer housing 22 defines aperture 28 proximal to exhaust fan 6, such that heat is removed or vented from heat sink by exhaust fan 6 such that the warm or hot air from the heat sink is vented from the portable cooling device through aperture 28. In some embodiments, outer housing 22 defines more than one aperture 28, for example a venting aperture; in other embodiments, outer housing 22 defines at least one aperture 28, for example a venting aperture. Outer housing 22 optionally includes frame 25 configured to show a display 24 therethrough.

Figure 6A:
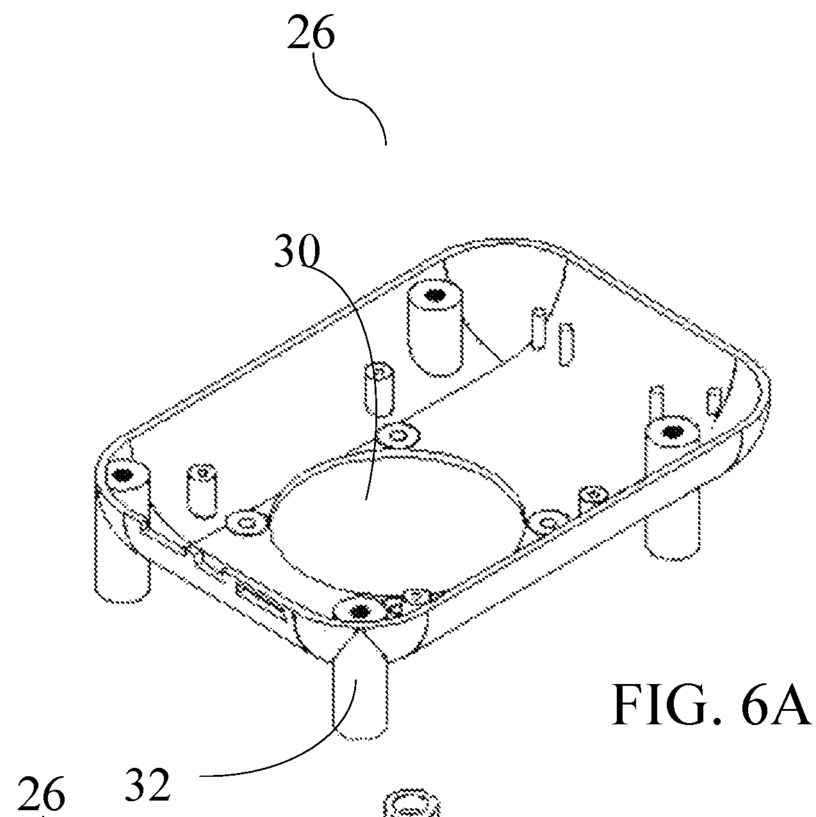
FIGS. 6A-6B show a top and a bottom perspective view, respectively, of a base of the device of FIG. 2.
Figure 6B:
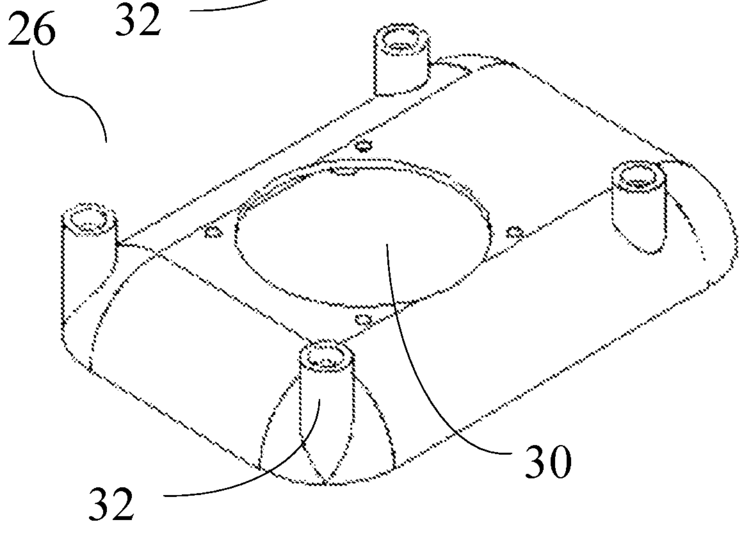

FIGS. 6A-6B show an embodiment of a base 26 of a portable cooling device. The base 26 functions to maintain the portable cooling device apart from or at a distance from a surface on which it rests. Alternatively, as shown and described elsewhere herein, base 26 may function or be configured to contact and rest on a surface. The base 26 includes or is formed of a curved surface; in other embodiments, the surface may be flat or planar. The base 26 defines an aperture 30 that is an intake aperture for exhaust fan 48 to cool the thermoelectric cooler 40. The base 26 further includes one or more feet 32 which are configured to maintain the portable cooling device apart from a surface on which it rests and allow more efficient air intake for exhaust fan 48. The feet 32 may further function to maintain the portable cooling device dry in damp or wet environments (e.g., bathroom, kitchen, etc.). In some embodiments, the portable cooling device does not include feet and instead a base 26 of the device rests on a surface. The base 26 may be positioned on an end of a portable cooling device or may extend along a side of a portable cooling device, as shown elsewhere herein.

Figure 7A:
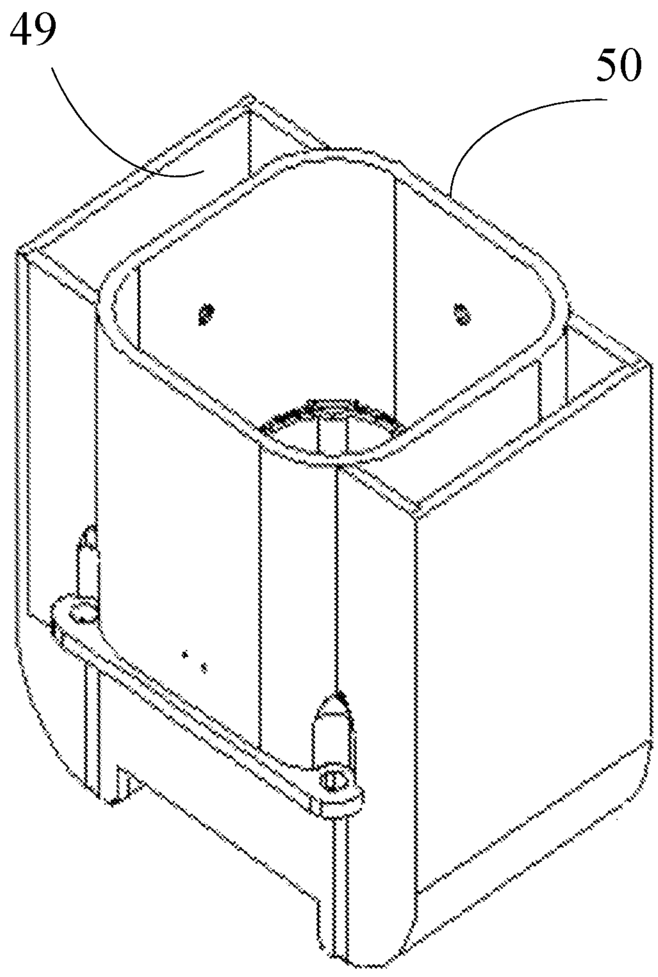
FIGS. 7A-7B show a top and a bottom perspective view, respectively, of an inner chamber of the device of FIG. 2.
Figure 7B:
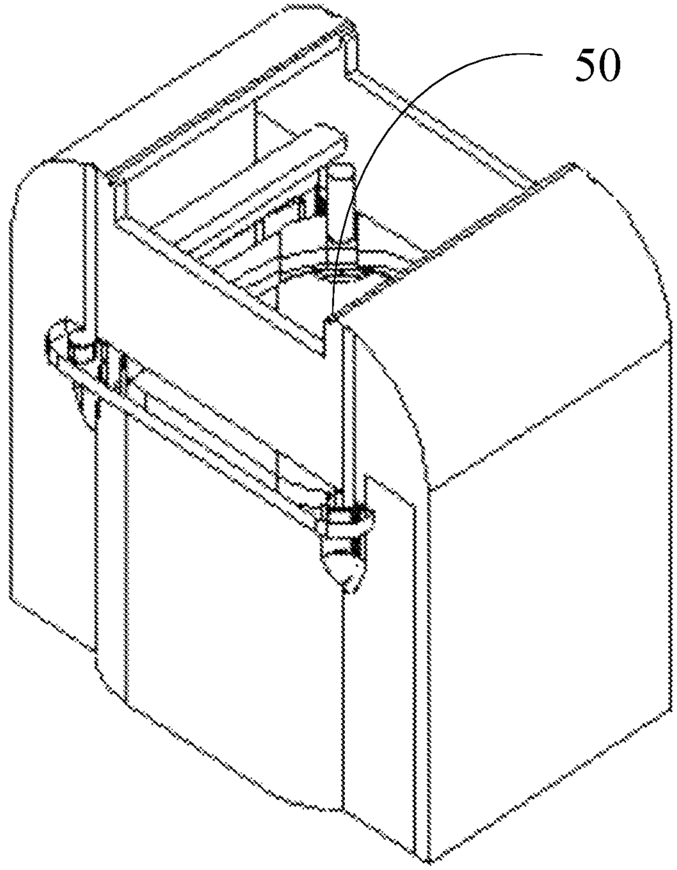

Turning now to FIGS. 7A-7B, which show an embodiment of an inner housing 50 of a portable cooling device. The inner housing 50 includes a columnar structure but may include any shape or structure. The inner housing 50 functions to receive a holder for holding, retaining, containing, or otherwise supporting one or more receptacles therein. Further, the inner housing 50 functions to house a core of the portable cooling device, the core including one or more fans and a thermoelectric cooler, as described elsewhere herein. Alternatively, a core may be positioned proximate to or adjacent to the inner housing 50 so that cooled air flows into and/or through inner housing 50. Outer housing 22 and inner housing 50 define air flow compartment or one or more channels 49 that are configured to allow air flow from the cooling side fan and heat sink to the top of the inner housing 50. In some embodiments, the one or more channels 49 may also direct the cooled air from the cold side of the fan to the top of the inner housing 50 to provide rapid cooling and maintaining a uniform temperature throughout the portable cooling device. In some embodiments, an insulation compartment resides external to the one or more channels.

FIG. 8 shows an embodiment of a core 300 of a portable cooling device. The core 300 may be positioned in the inner housing 50 or adjacent to or proximate to inner housing 50, as shown in FIGS. 7A-7B, and includes compartment fan 38; thermoelectric cooler 40 including cold side 42, aluminum heat pipe 44, hot side 46, and thermoelectric device 47; and exhaust fan 48, as described elsewhere herein. The compartment fan 38 and exhaust fan 48 flank thermoelectric cooler 40, such that cold air from a cold side 42 of the thermoelectric cooler is distributed throughout housing and/or to a holder positioned in aperture 39 and heat from the hot side and heat sink of the thermoelectric cooler 40 is vented to an external environment by exhaust fan 48. Components of core 300 are positioned relative to one another using frame 41, which may include dowels, pegs, hypotubes, or the like.

Figure 10:
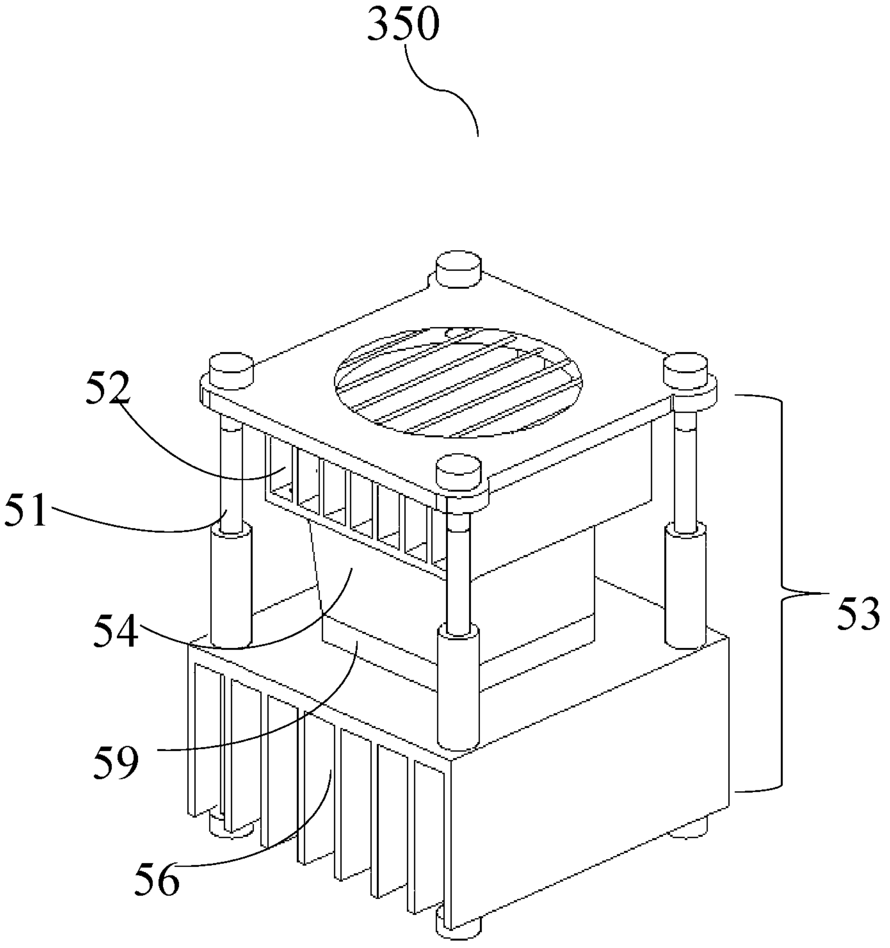
FIG. 10 shows another embodiment of a core of a portable cooling device.

In some embodiments, as shown in FIG. 10, a portable cooling device includes a core 350 without any moving parts, for example the core 350 does not include a compartment fan and exhaust fan but includes a thermoelectric cooler 53 including a first side or cold side 52, aluminum heat pipe 54, thermoelectric device 59, and a second side or hot side 56. In some such embodiments, a housing of the portable cooling device may include or be formed of one or more materials that act as a heat sink for the thermoelectric cooler. For example, a portion of or all of the housing may include or be formed of aluminum, copper, or graphene, or other suitable materials known in the art. Alternatively, or additionally, frame 51 may include or form a portion of a heat sink for the thermoelectric cooler. Further, in such embodiments that lack a compartment fan, a compartment within the portable cooling device may be cooled via convection (i.e., warmer air rising towards lid of device and cooler air settling near the receptacles in the compartment or in a holder).

Figure 9:
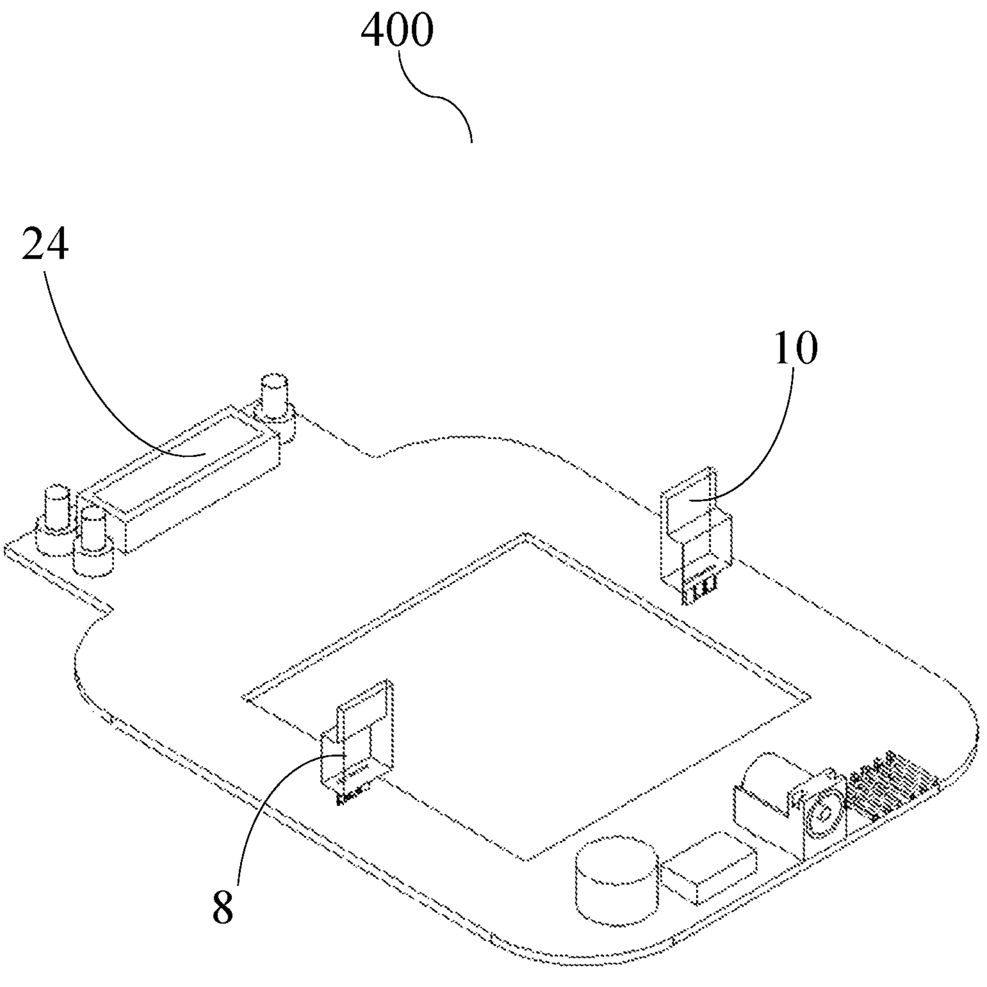
FIG. 9 shows a perspective view of a circuit board of the device of FIG. 2.

In some embodiments, as shown in FIG. 9, a portable cooling device includes a circuit board 400. Circuit board 400 may include a wire wrap board or a printed circuit board with display 24, regulator 8, transistor 10, processor 12, power source 14, etc., as described elsewhere herein. Circuit board 400 may be positioned between base 26 and housing 22.

Figure 17A:
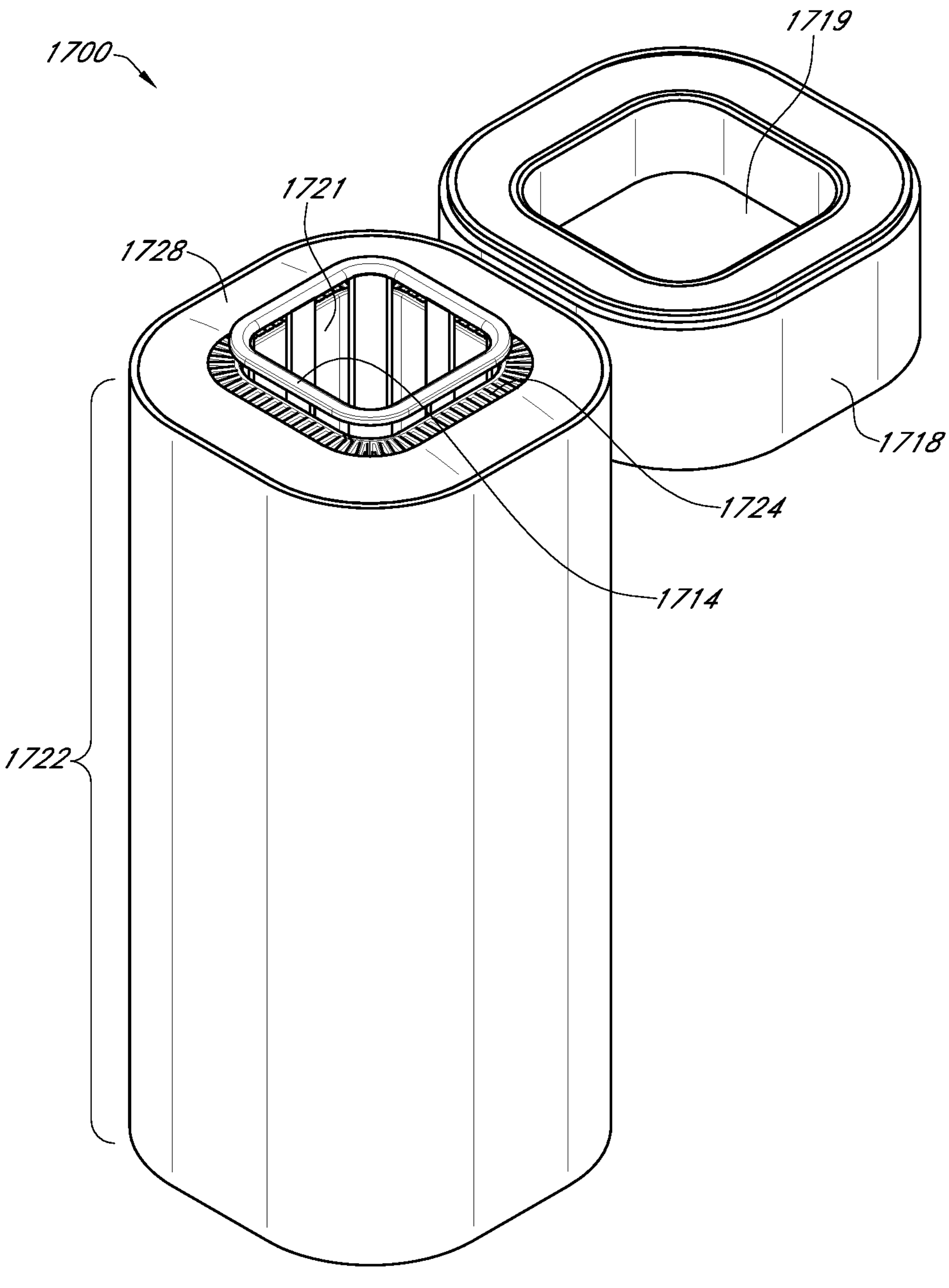
FIG. 17A shows another embodiment of a portable cooling device in an open configuration.
Figure 17B:
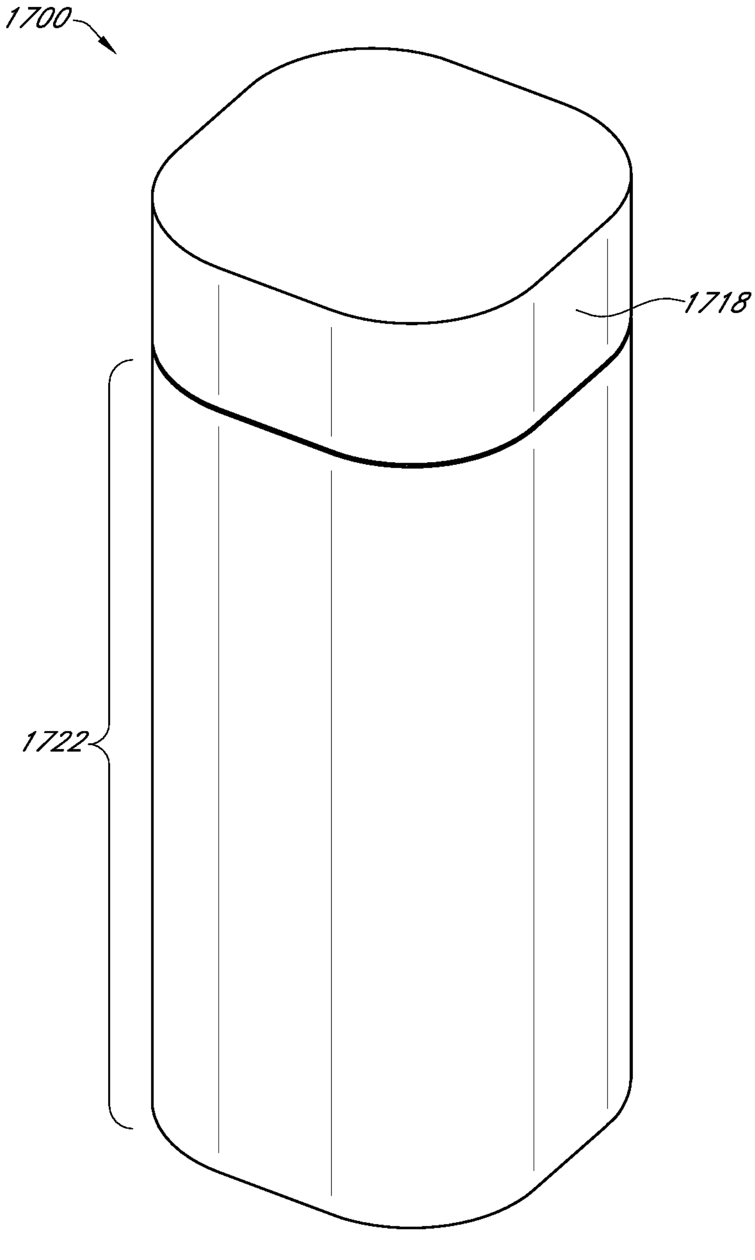
FIG. 17B shows the portable cooling device of FIG. 17A in a closed configuration.
Figure 17C:
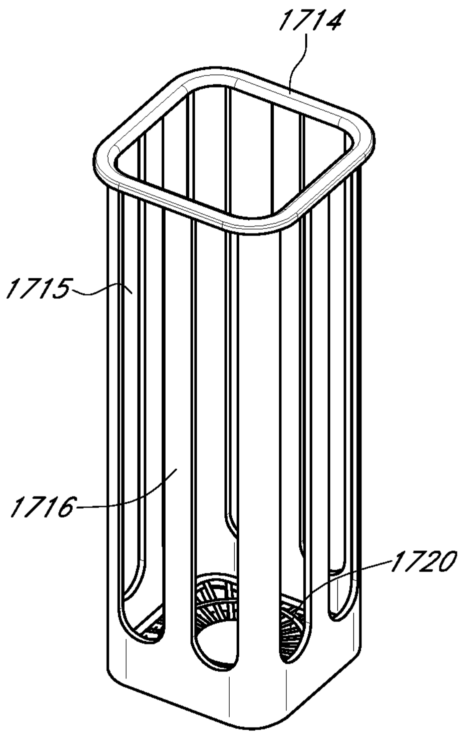
FIG. 17C shows one embodiment of a receptacle reversibly insertable into the portable cooling device of FIG. 17A.
Figure 17D:
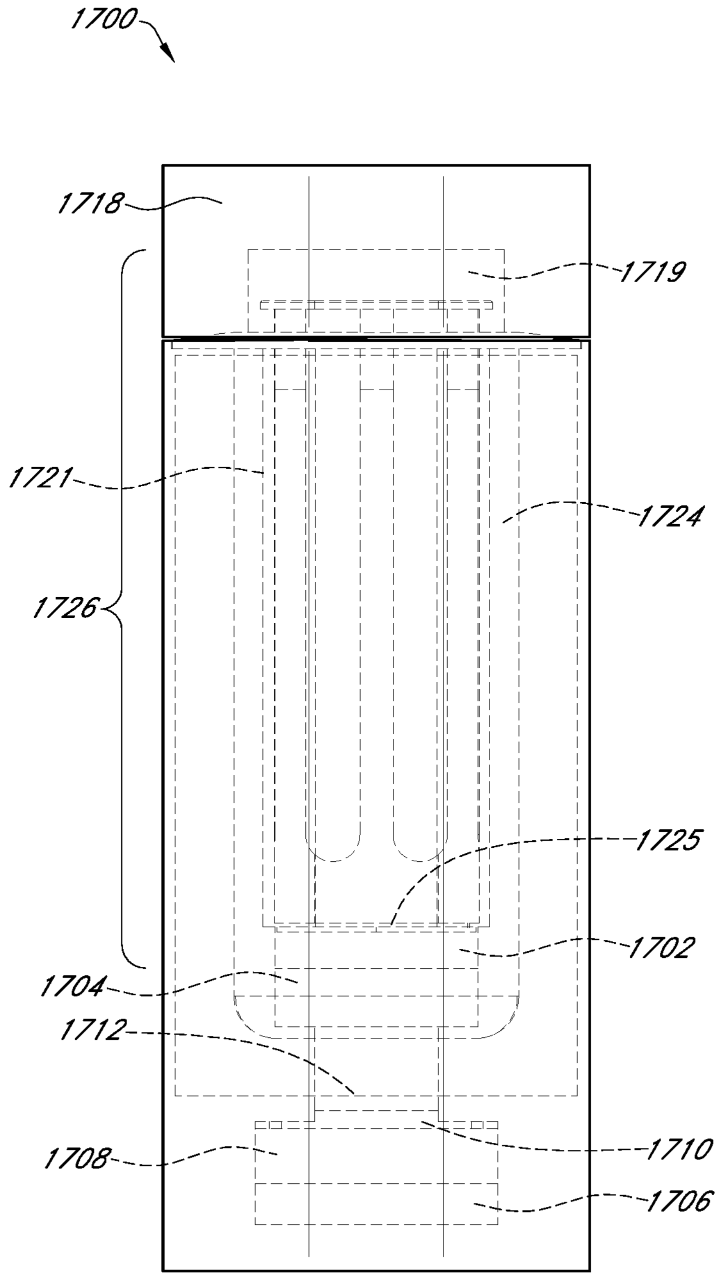
FIG. 17D shows a cross-sectional view of the portable cooling device of FIG. 17A.
Figure 17E:
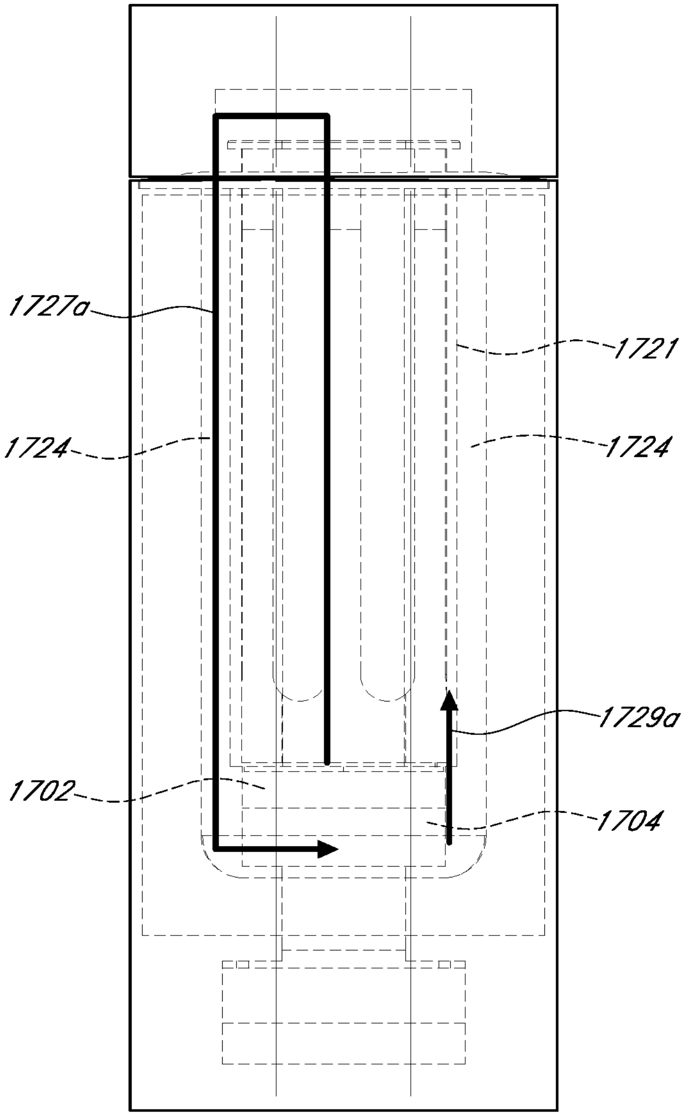
FIG. 17E shows airflow from a compartment fan in one embodiment of a portable cooling device.
Figure 17F:
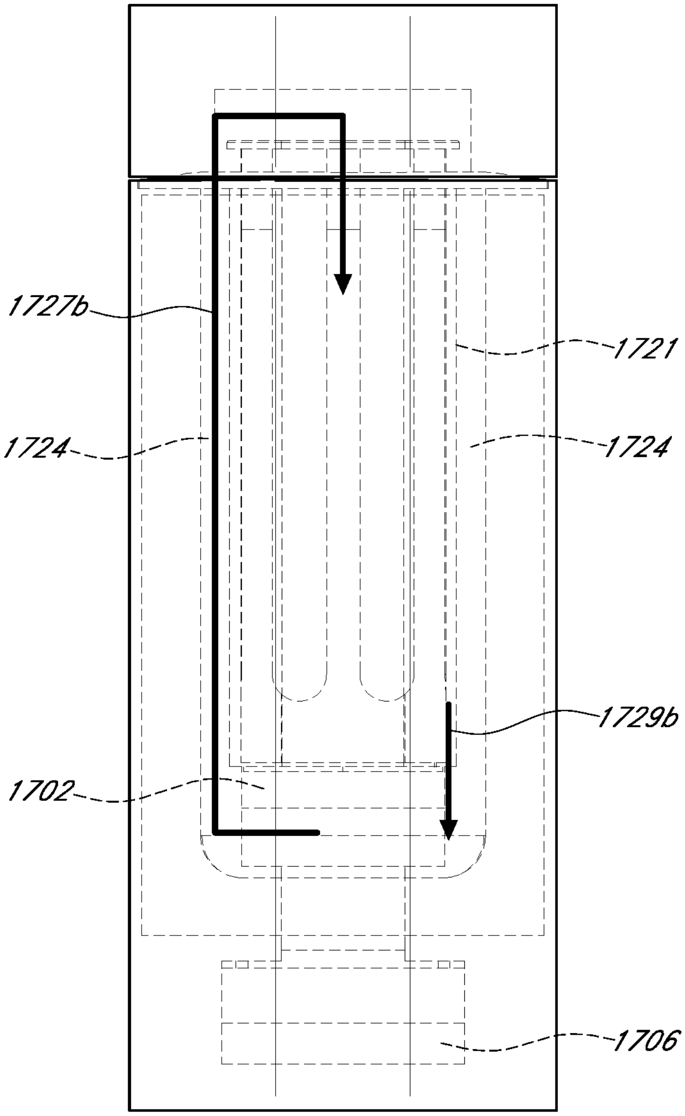
FIG. 17F shows airflow from a compartment fan, in an opposite orientation to that of FIG. 17E, of a portable cooling device.

Turning now to FIGS. 17A-17D, which show another embodiment of a portable cooling device 1700. The portable cooling device 1700 has an open configuration, as shown in FIG. 17A, in which an inner housing 1721 of the device 1700 is accessible. Inner housing 1721 is configured to store one or more receptacles therein. In an open configuration, a lid 1718 of device 1700 is open or at least partially decoupled from the body or outer housing 1722, for example via a hinge mechanism, snap fit connection, thread-based mechanism, etc. Lid 1718 further defines a depression 1719 therein that forms part of the cooling chamber or compartment 1726, as shown in FIG. 17D. Alternatively, lid 1718 may not define a depression or otherwise may include a fan or another component as shown and described elsewhere herein. The cooling chamber or compartment 1726 may be airtight for efficient cooling and sufficient cleanliness of the receptacles stored therein. Insulation 1728 resides in a space defined between the outer housing 1722 and the inner housing 1721. The closed configuration of the device 1700 is shown in FIG. 17B, where lid 1718 is coupled or secured to body or outer housing 1722. The device 1700 may include a lock that restricts access to the inner housing. For example, the lock may be a latch that may be combined with a lock or may include a built-in lock, for example combination lock, biometric scanner (e.g., facial recognition, fingerprint recognition, etc.), a passcode or password entry pad, etc. As shown in FIGS. 17A and 17D, device 1700 may further include one or more channels 1724 for distributing airflow at least partially around or along inner housing 1721. The one or more channels 1724 may extend circumferentially around the inner housing 1721, extend axially along a length of the inner housing 1721, communicatively and/or fluidly couple compartment fan 1702 and inner housing 1271, etc. The channels 1724 may be substantially linear, have a curved pattern, have a chevron pattern, have a wavy pattern, etc. As shown in FIG. 17E, airflow, shown by arrow 1727*a*, may pass through inner housing 1721 and then through one or more channels 1724. Alternatively, airflow, as shown by arrow 1727*b*, may pass through one or more channels 1724 and then through inner housing 1721. Both orientations are described in further detail elsewhere herein. Further, as shown in FIGS. 17A and 17C, the device 1700 is configured to receive a holder 1714 in the inner housing 1721. Holder 1714 includes one or more axially extending slats 1716 defining one or more or a plurality of elongated apertures 1715 therebetween. The elongated apertures 1715 may be simply stylistic; in other embodiments, the elongated apertures 1715 allow cooled air circulating through the one or more channels 1724 and/or inner housing 1721 to more effectively and/or efficiently cool the receptables held by the holder 1714. A base of the holder 1714 may define one or more or a plurality of apertures 1720 that allow cooled air generated by the cooling system to be transferred into the holder 1714. Device 1700 may include, as described elsewhere herein, a cooling core including compartment fan 1702; exhaust fan 1706; heat sinks 1704, 1708; cooling element 1710 (e.g., thermoelectric cooler); and heat transfer block 1712. As shown in FIG. 17D, the components of the cooling core may reside at least partially within the outer housing 1722 and the inner housing 1721. As an example, as shown in FIG. 17D, compartment fan 1702 and heat sink 1704 are positioned at least partially in the inner housing 1721 while the cooling element 1710, heat transfer block 1712, heat sink 1708, and exhaust fan 1706 are positioned at least partially in the outer housing 1722 or between the inner housing 1721 and the outer housing 1722.

Figure 18A:
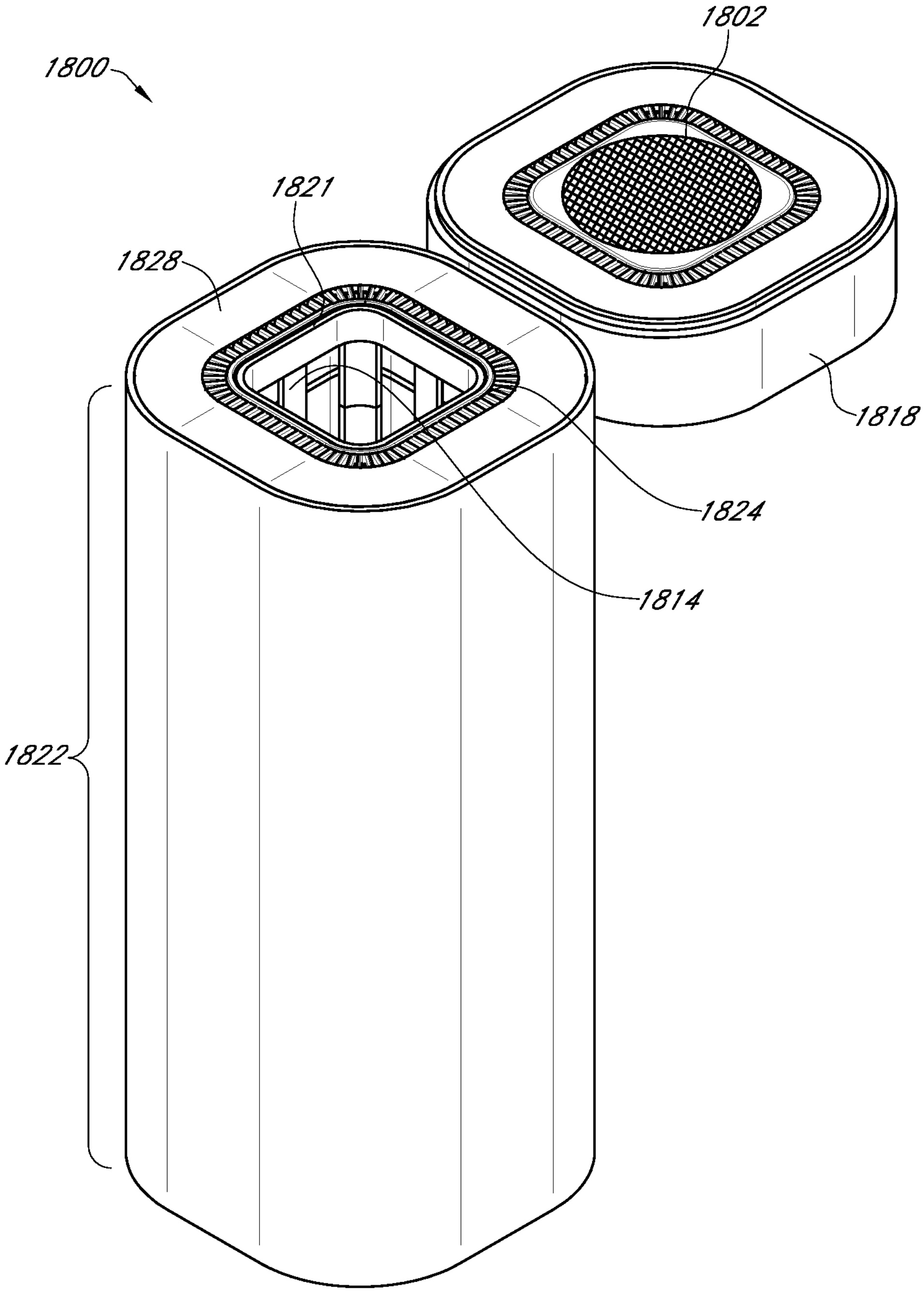
FIG. 18A shows another embodiment of a portable cooling device in an open configuration with a compartment fan in a lid of the device.
Figure 18B:
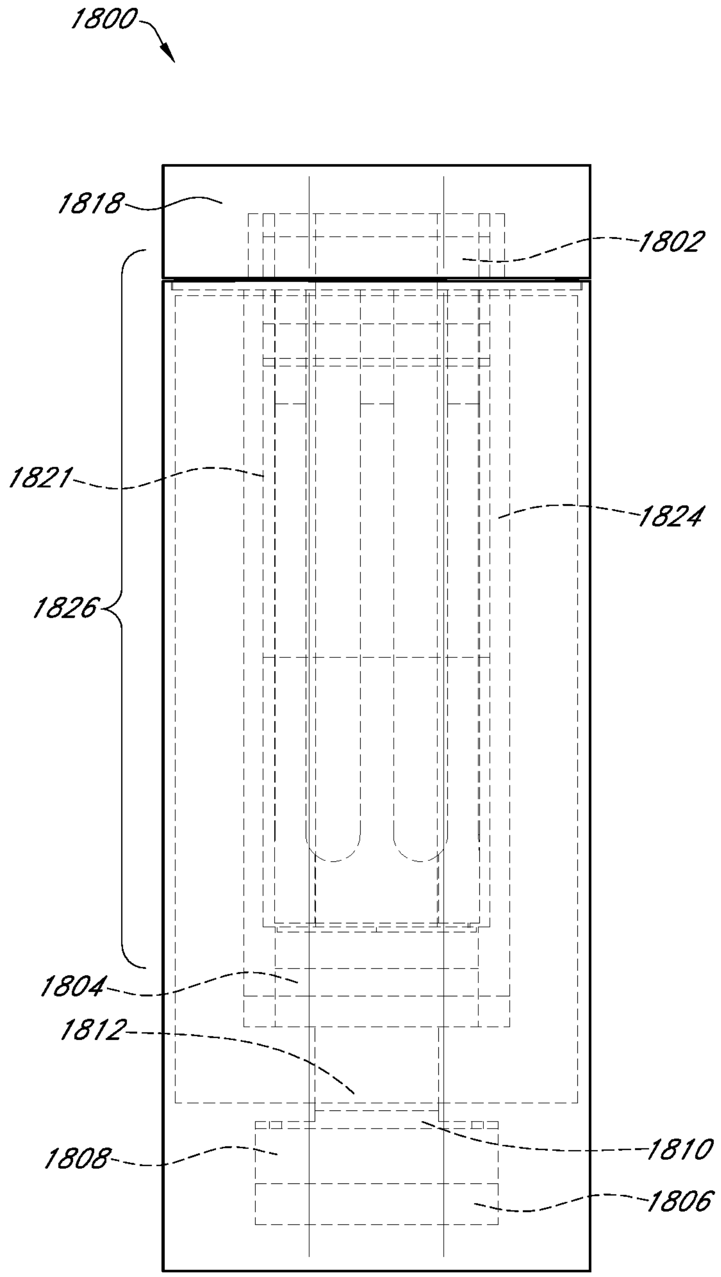
FIG. 18B shows a cross-sectional view of the portable cooling device of FIG. 18A.

FIGS. 18A-18B show another embodiment of a portable cooling device 1800. The embodiment shown in FIGS. 18A-18B is the same as the embodiment shown in FIGS. 17A-17D, in that device 1800 includes lid 1818; outer housing 1822; one or more channels 1824; insulation 1828; removably insertable holder 1814; inner housing 1821; compartment fan 1802; exhaust fan 1806; heat sinks 1812, 1808; heat transfer block 1812; and cooling element 1810. However, as shown in FIGS. 18A-18B, compartment fan 1802 is positioned in lid 1818 in the depression 1719 shown in FIG. 17A. Such a configuration (i.e., compartment fan 1802 in lid 1818) may better protect the compartment fan 1802 from liquid that it may otherwise contact when positioned at or near a bottom of inner housing 1821. However, this configuration (compartment fan 1802 in lid 1818) may limit a length of a receptable that is positionable in cooling compartment 1826 or holder 1814 as compared to the configuration (compartment fan 1702 at or near bottom of inner housing 1721) shown in FIG. 17D, since the cooling compartment 1726 in FIG. 17D is longer than that of cooling compartment 1826 in FIG. 18B.

Figure 19A:
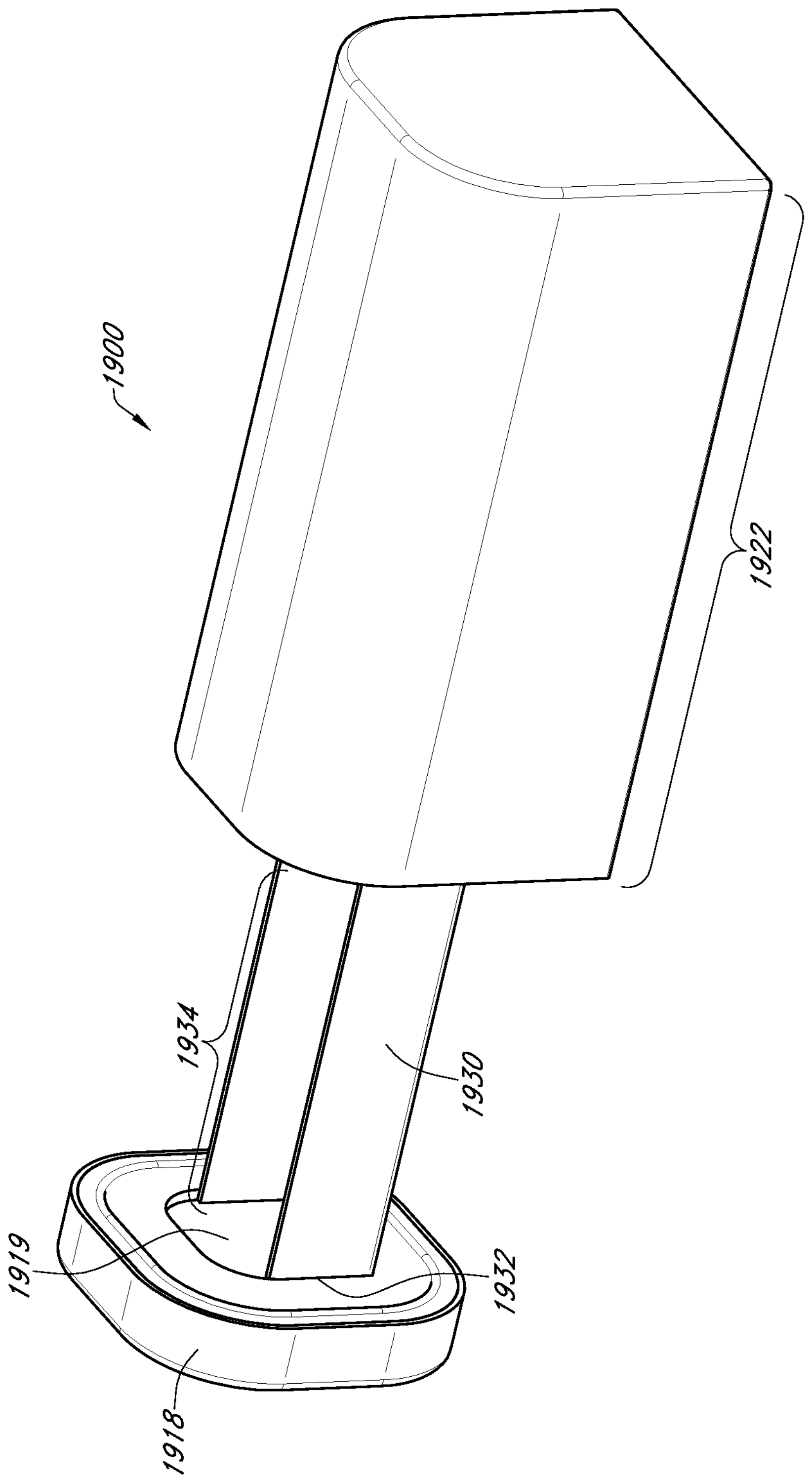
FIG. 19A shows another embodiment of a portable cooling device including a storage receptable including a rail system.
Figure 19B:
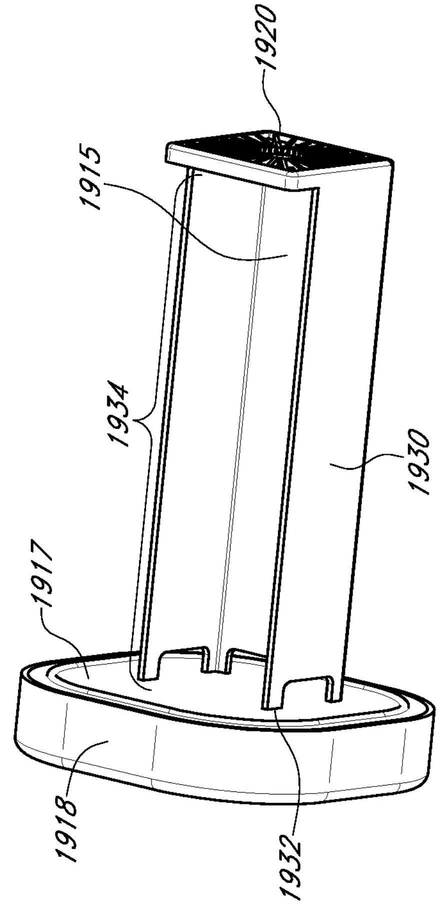
FIG. 19B shows another embodiment of a storage receptable fully removed from the portable cooling device.
Figure 19C:
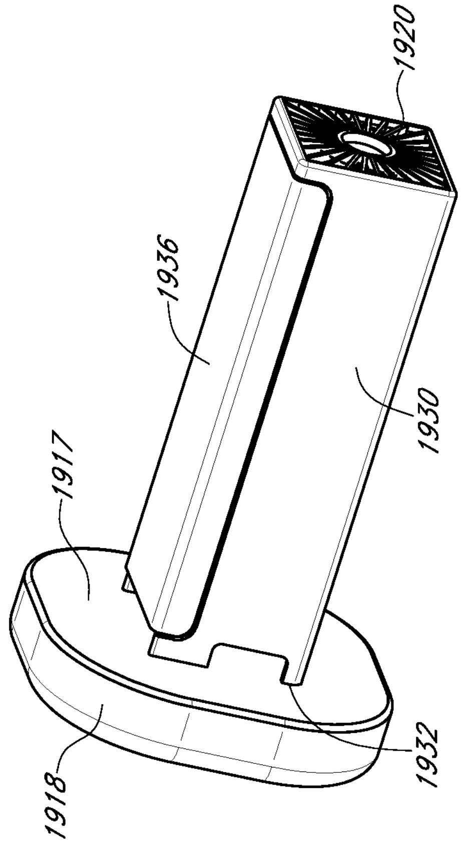
FIG. 19C shows another embodiment of a storage receptable of a portable cooling device.

FIGS. 19A-19C show various embodiments of a holder coupled to a lid 1918 of a portable cooling device 1900. The holder may include a rail system 1930 for storing one or more receptacles. The holder may include at least two rails 1930 that are parallel to and set apart from one another. The at least two rails 1930 are coupled to lid 1918 at attachment point 1932 and extend axially from lid 1918. The at least two rails 1930 define a storage space 1934 therebetween for storing one or more receptacles therein. A sidewall 1915 may extend between the at least two rails 1930 to further defined storage space 1934. Plate 1920 may join the at least two rails 1930 at an end opposite the lid 1918 and may, optionally, define one or more apertures therein for allowing cooled air to more readily interact with the holder and thus the receptacles therein. Plate 1920 may be parallel to lid 1918 when rails 1930 extend therebetween. Storage space 1934 defined by the at least two rails 1930 may be further defined by cover 1936 that couples to one or more of: one or more of rails 1930, lid 1918, and plate 1920 to fully enclose storage space 1934. As shown in FIG. 19A, lid 1918 may define a depression 1919 therein or, as shown in FIGS. 19B-19C, may include a flat or substantially flat inner surface 1917.

Figure 20A:
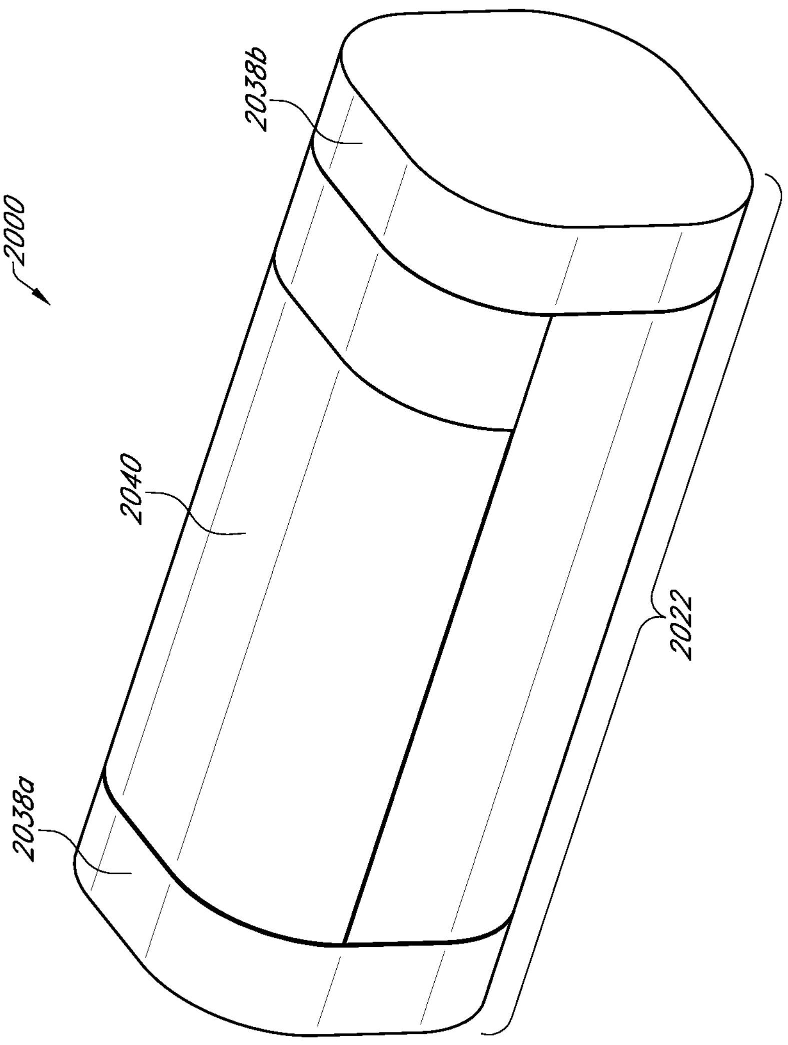
FIG. 20A shows another embodiment of a portable cooling device in a closed configuration.
Figure 20B:
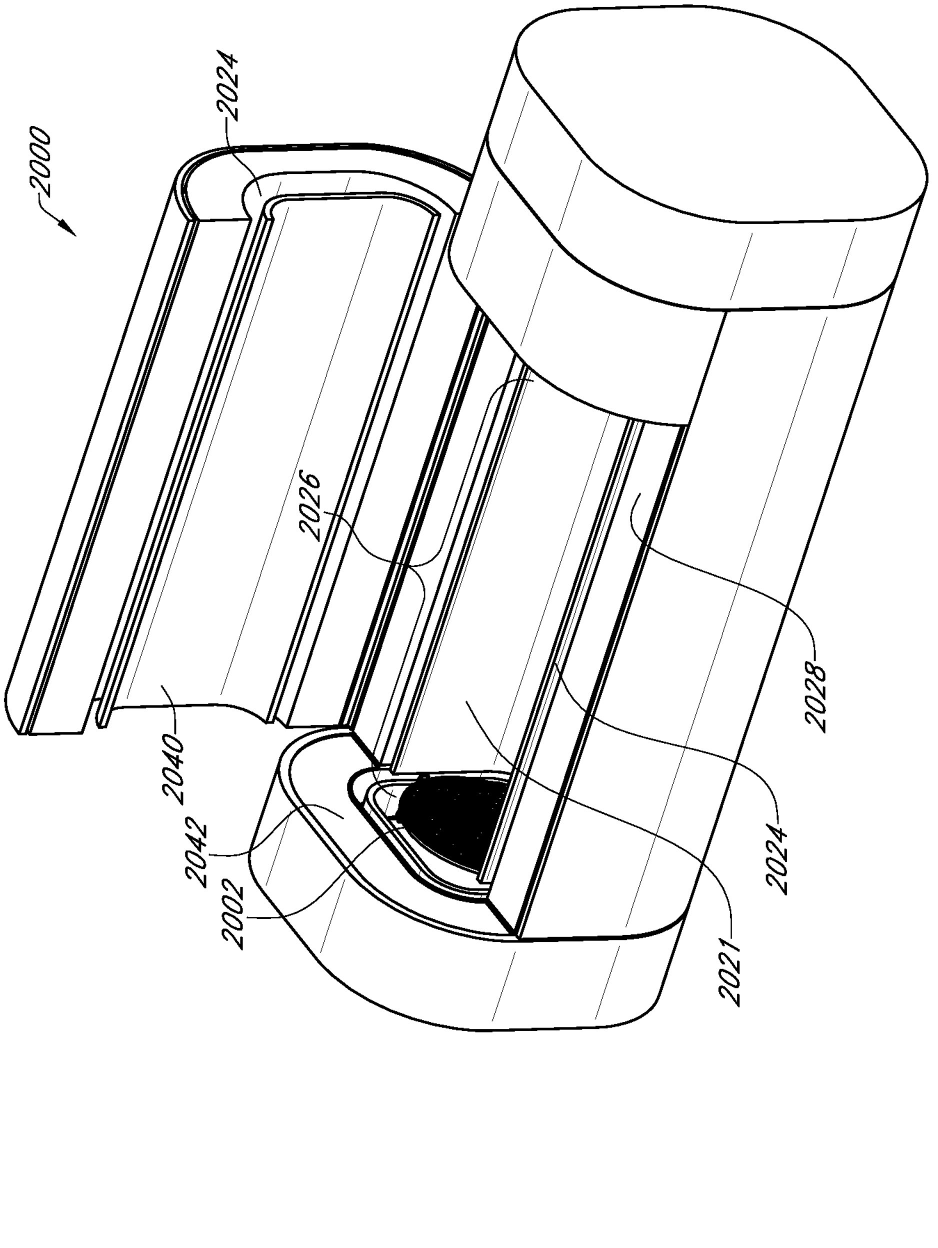
FIG. 20B shows the portable cooling device of FIG. 20A in an open configuration.

FIGS. 20A-20B show another embodiment of a portable cooling device 2000. The portable cooling device 2000 is shown in a closed configuration in FIG. 20A and an open configuration in FIG. 20B. Device 2000 includes a first end 2038*a* opposite a second end 2038*b*. The first end 2038*a* includes compartment fan 2002 and the second end 2038*b* includes the exhaust fan, heat sinks, cooling element, and heat transfer block, similar to that shown in FIG. 18B. Alternatively, device 2000 may include all the cooling components (e.g., fans, heat sinks, cooling element, heat transfer block, etc.) in the second end 2038*b* similar to that shown in FIG. 17D. Outer housing 2022 and inner housing 2021 define an insulation space or region 2028. Hatch or lid 2040 and inner housing 2021 define cooling chamber 2026 for receiving a holder and/or one or more receptacles therein. As shown in FIGS. 20A-20B, hatch or lid 2040 is positioned on a side of device 2000 in a sidewall of device 2000 as opposed to an end of device 2000 as shown and described elsewhere herein. The hatch or lid 2040 couples and decouples, reversibly, from body 2022 via any mechanism known in the art, for example, a hinged mechanism, snap-fit connection, spring-loaded, etc. Device 2000 may further include one or more channels 2024 for circulating cooled air at least partially around chamber 2026. The one or more channels 2024 may extend an axially length of outer housing 2022 or an axially length of cooling chamber 2026. Cooling chamber 2026 may extend into the first end 2038*a*, where the first end 2038*a* defines cavity 2042 for circulating air. Cavity 2042 may be defined by compartment fan 2002 and first end 2038*a*.

Figure 21:
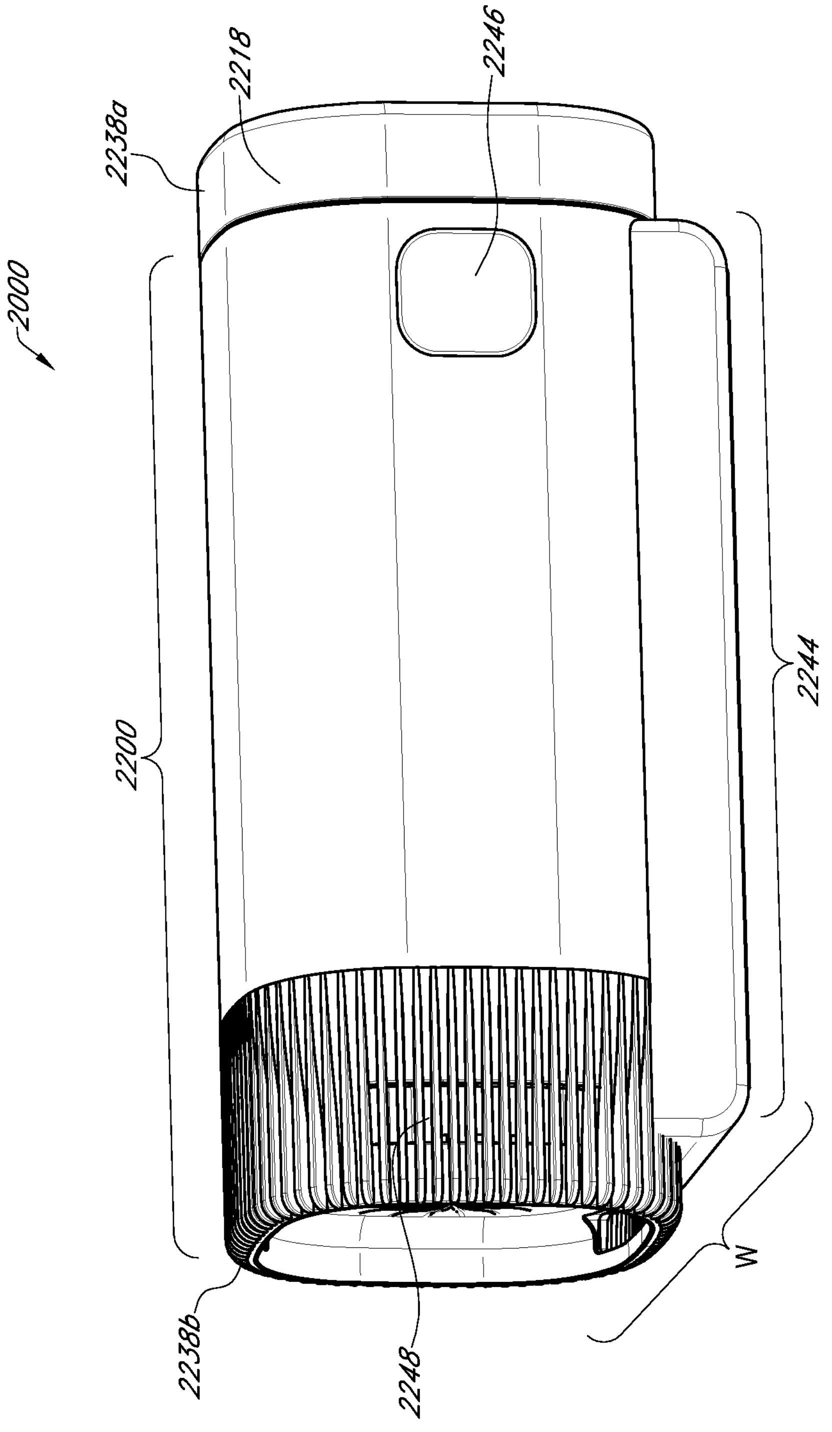
FIG. 21 shows another embodiment of a portable cooling device including an axially extending support and a user input element on a sidewall of a body of the device.
Figure 23:
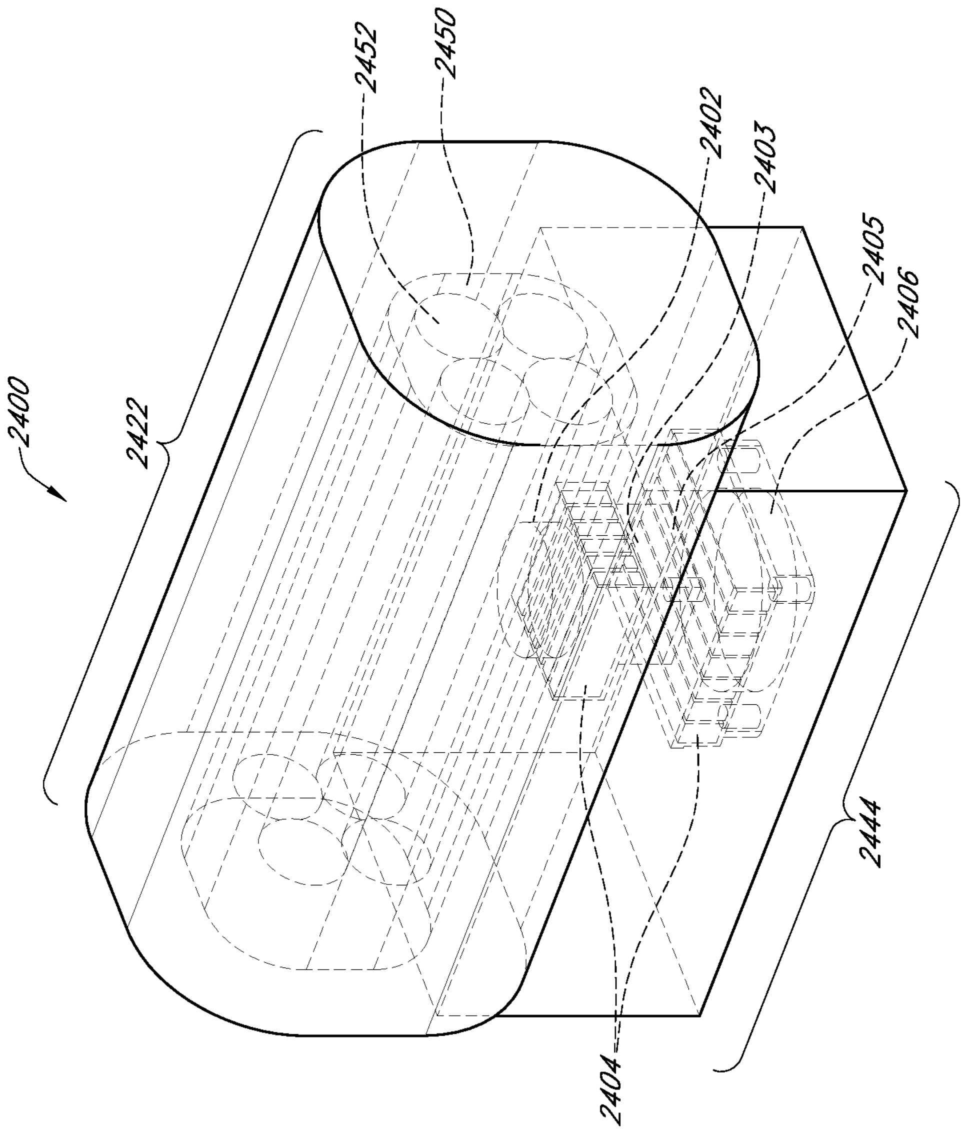
FIG. 23 shows another embodiment of a portable cooling device with various components positioned in an axially extending support of the device.

FIG. 21 shows another embodiment of a portable cooling device 2200 including an axially extending base 2244 and a user input element 2246 on a sidewall of a body of the device. As shown in FIG. 21, device 2200 includes an axially extending base 2244 along a sidewall of body 2222 (as opposed to a base on an end of the device, as described elsewhere herein). Base 2244 extends between a first or lid end 2238*a* and a second end 2238*b* of device 220. Base 2244 may include or be formed of one or more feet and/or may be formed of or include a panel that is substantially or about the same width W as device 2200. In any of the embodiments described herein, a portable cooling device may be configured to operate both when positioned on base 2244 and when positioned on second end 2238*b* (also shown as base 26 in FIGS. 6A-6B). The fans, heat transfer block, heat sinks, cooling element, etc. may reside in a second end 2238*b* of device 2200 (e.g., similar to FIG. 17D); in a first end 2238*a* and a second end 223*b* (e.g., similar to FIG. 18B); or at least partially in base 2244. As shown in FIG. 23, axially extending base 2444 of portable cooling device 2400 includes an exhaust fan 2406; one or more heat sinks 2404, heat transfer block 2403, and a cooling element 2405 therein while a compartment fan 2402 resides in cooling chamber or inner housing 2450. Inner housing 2450 may further include one or more axially extending storage chambers 2452. Storage chambers 2452 may be sized and/or shaped to receive a holder therein and/or a syringe, pen, or other elongate receptable therein. A number of storage chambers 2452 may be adjustable, for example during manufacturing or during use (e.g., user may add or remove storage chambers from inner housing 2450). The storage chambers 2452 may be fixedly positioned in inner housing 2450 or removably positioned in inner housing 2450 such that a number and/or distribution of the storage chambers may be adjusted. In some embodiments, a storage chamber is equivalent to a holder such that they may be used interchangeably.

Figure 22:
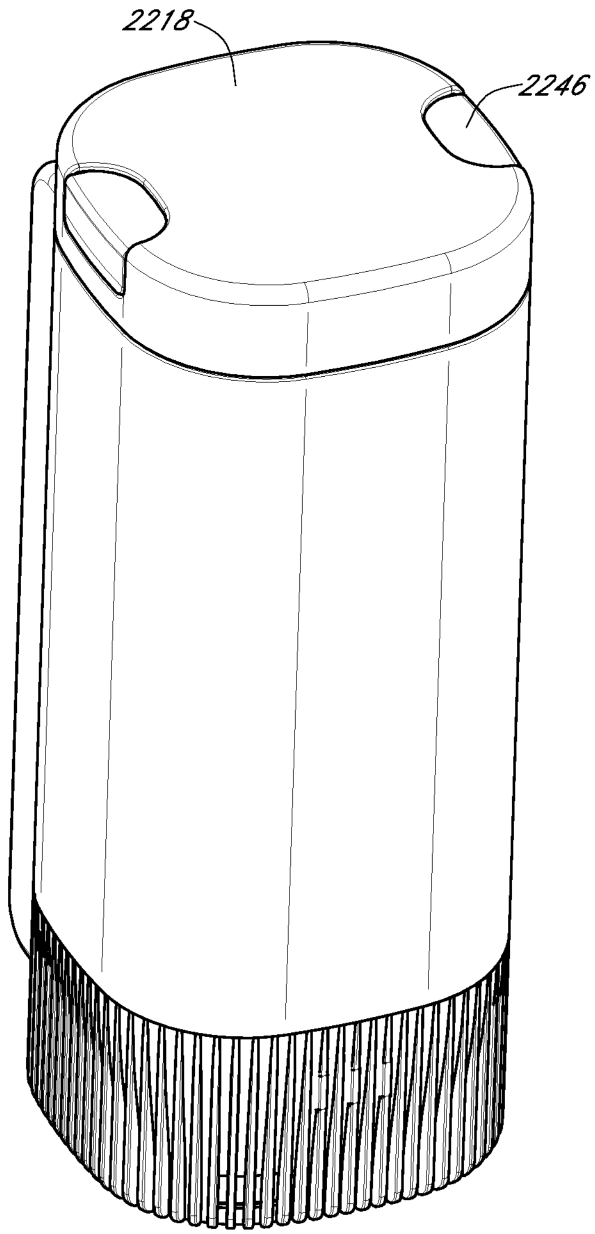
FIG. 22 shows another embodiment of a portable cooling device including a user input element on a lid of the device.

Any of the devices herein may include a user input element (e.g., button, switch, etc.) anywhere on the device or body of the device for releasing a lid of the device, turning on the device, adjusting a parameter of the device (e.g., temperature, connection status, etc.), etc. As shown in FIG. 21, in one non-limiting example, device 2200 includes a user input element 2246 near or approximate or adjacent to a lid 2218 of device 2200 to release a latch for lid 2218 so that the contents of device 2200 may be accessed. As another non-limiting example, as shown in FIG. 22, a user input element 2246 may be located on a lid 2218 of the device. Further, in any of the embodiments described herein, a body or outer housing of a portable cooling device may further define an aperture 2248 for venting warm air from the portable cooling device using an exhaust fan.

Figure 24:
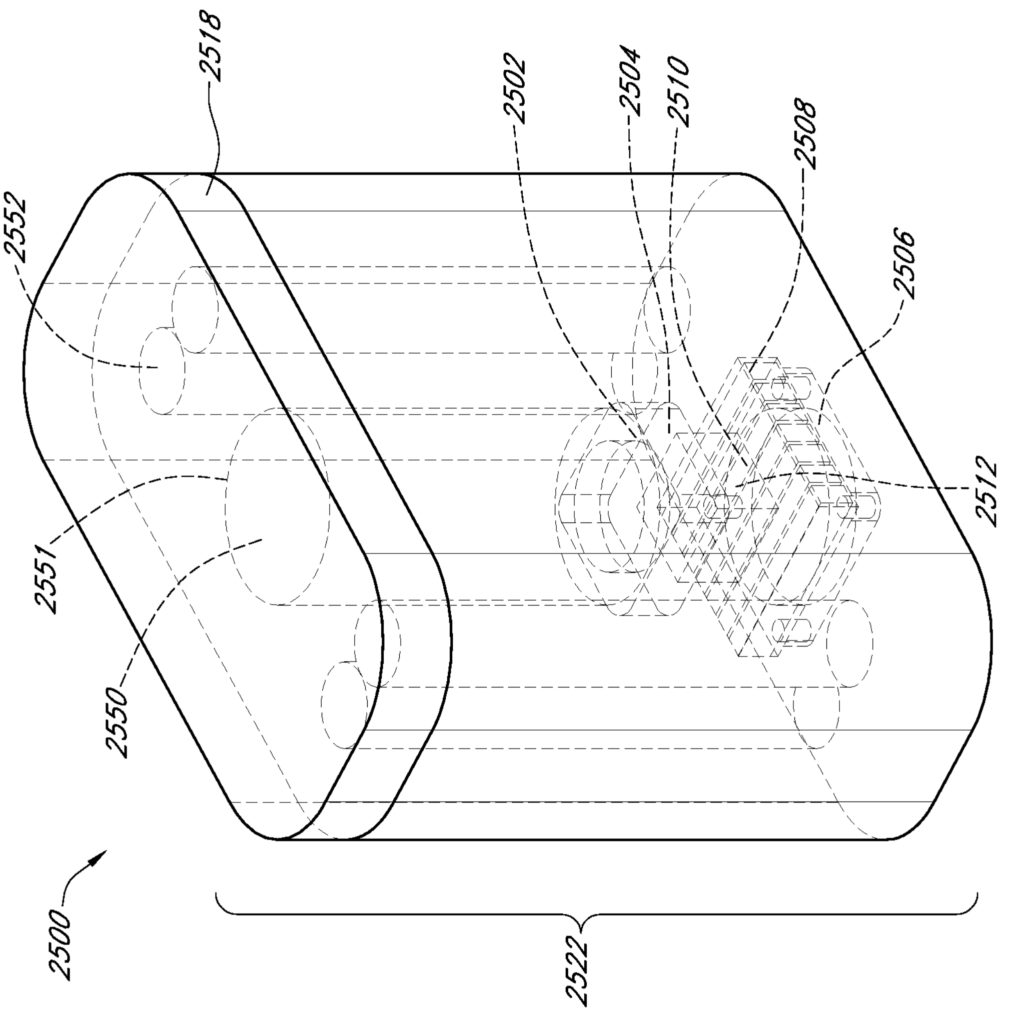
FIG. 24 shows another embodiment of a portable cooling device including a cooling chamber and one or more storage chambers.

In some embodiments, as shown in FIG. 24, a portable cooling device 2500 may include outer housing 2522 and lid 2518; a cooling chamber or inner housing 2550 that includes a compartment fan 2502, heat sinks 2504, 2508, cooling element 2510, heat transfer block 2512, and exhaust fan 2506 therein; and one or more storage chambers 2552 arranged around an outer perimeter 2551 of cooling chamber 2550 or arranged substantially concentrically around cooling chamber 2550. Storage chambers 2552 may be sized and/or shaped to receive a syringe, pen, or other elongate receptable therein. A number of storage chambers 2552 may be adjustable, for example during manufacturing or during use (e.g., user may add or remove storage chambers from cooling chamber 2550). The storage chambers 2552 may be fixedly positioned around cooling chamber 2550 or removably positioned around inner housing 2550 such that a number and/or distribution of the storage chambers may be adjusted.

Figure 15:
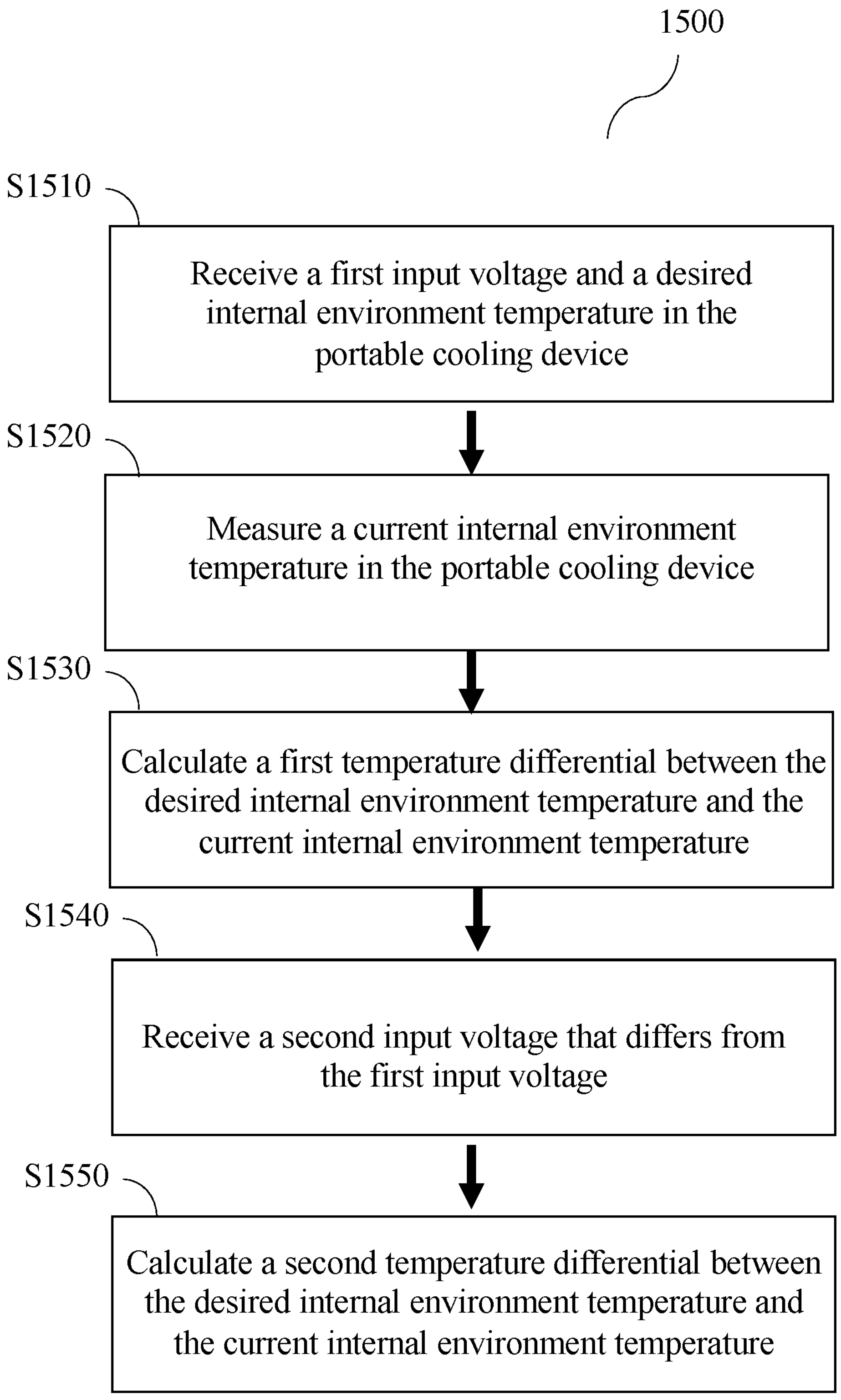
FIG. 15 shows a flow chart of a method of cooling using a portable cooling device.

Turning now to FIG. 15, which shows a method 1500 of cooling a receptacle using a portable cooling device including: receiving a first input voltage and a desired internal environment temperature (e.g., via an input display or computing device) in the portable cooling device S1510; measuring a current internal environment temperature (using an internal temperature probe) in the portable cooling device S1520; calculating a first temperature differential between the desired internal environment temperature and the current internal environment temperature 51530; receiving a second input voltage that differs from the first input voltage S1540; and calculating a second temperature differential between the desired internal environment temperature and the current internal environment temperature 51550.

In some embodiments, the method further includes comparing the first temperature differential to the second temperature differential; and outputting to a user a recommended input voltage or a desire input power to the thermoelectric cooler to achieve a desired temperature differential. In some embodiments, the method further includes comparing the first temperature differential to the second temperature differential; and automatically adjusting the input voltage or a power to the thermoelectric cooler to achieve a desired temperature differential and/or internal temperature.

Figure 16:
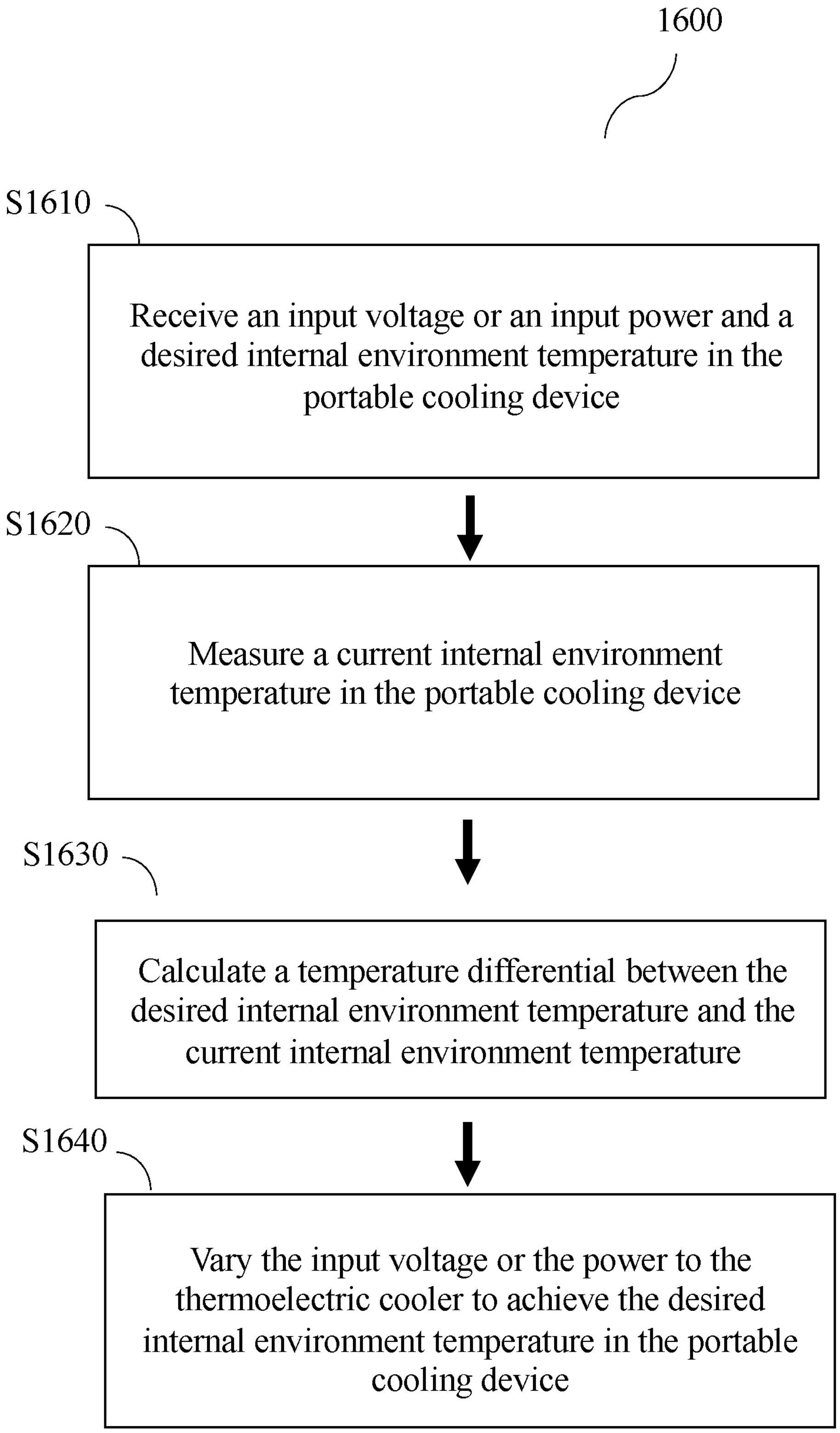
FIG. 16 shows a flow chart of a method of cooling using a portable cooling device.

As shown in FIG. 16, a method 1600 of cooling a receptacle using a portable cooling device includes receiving a first input voltage or an input power and a desired internal environment temperature in the portable cooling device S1610; measuring a current internal environment temperature (using an internal temperature probe) in the portable cooling device S1620; calculating a temperature differential between the desired internal environment temperature and the current internal environment temperature 51630; and varying the input voltage or the input power to the thermoelectric cooler to achieve the desired internal environment temperature in the portable cooling device S1640.

In some embodiments, block S1640 is performed automatically by the portable cooling device or on-demand or manually by a user.

In some embodiments, the input voltage may be 2 V, 3 V, 4 V, 5 V, 6 V, 7 V, 8 V, 9 V, 10 V, 11 V, 12 V, 13 V, 14 V, or 15V. The input voltage may be 1-5 V, 5-10 V, 10-15 V, 1-3 V, 3-5 V, 5-7 V, 5-9 V, 9-11 V, 11-13 V, or 13-15 V. The input voltage may be 4.8 V to 5.2 V, 5.2 V to 5.6 V, 5.6 V to 6 V, 6 V to 6.4 V, 6.4 V to 6.8 V, or 6.8 V to 7.2 V. The input voltage may be at least 2 V, at least 3 V, at least 4 V, at least 5 V, at least 6 V, at least 7 V, at least 8 V, at least 9 V, at least 10 V, at least 11 V, at least 12 V, at least 13 V, at least 14 V, or at least 15 V.

In some embodiments, a first input voltage is less than a second input voltage resulting in the first temperature differential being less than the second temperature differential. In some embodiments, the first input voltage is 5 volts and the second input voltage is 6 volts. In some embodiments, the first input voltage is more than the second input voltage resulting in the first temperature differential being greater than the second temperature differential.

In some embodiments, the first input voltage is different than the second input voltage.

In some embodiments, a desired internal environment temperature is based on a prescribed or required temperature for a receptacle, cosmetic, drug, pharmaceutical, etc. positioned in the portable cooling device, for example in a holder in the portable cooling device. In some embodiments, a desired internal environment temperature is based on a changing external environment, for example during commuting, transporting, environmental temperature fluctuations, frequency of opening and closing the portable cooling device, etc.

In some embodiments, a temperature or temperature differential may be displayed on a display of the portable cooling device and/or computing device (e.g., remote computing device, mobile computing device, server, etc.).

In some embodiments, varying a power supplied to the thermoelectric cooler enables a capacity of the thermoelectric cooler to be increased. For example, if a user is in a 72° F. room, the unit can cool adequately at **5*v*** and use just one amp or less, so it can run off a USB powered port or a standard external cellphone battery. But if a user is outside in a 95° F. environment, the user could use up to a 12 v wall transformer that can supply up to 3 amps to get enough cooling from the unit. The cooling capability can be varied based on a power level supplied to the thermoelectric cooler.

In some embodiments, method 1500 and/or 1600 includes any of the embodiments of a portable cooling device described and/or contemplated herein and/or available to one of skill in the art. For example, the portable cooling device may or may not be communicatively coupled to a computing device, may or may not include one or more fans, may or may not include a display, may or may not include an antenna, etc.

In some embodiments, one or more steps of method 1500 and/or 1600 are performed by processor 12 as shown in FIG. 1, such that circuit board 400 includes a computer-readable medium having non-transitory, processor-executable instructions stored thereon. Execution of the instructions causes the processor to perform one or more methods described elsewhere herein.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor in the portable cooling device and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

Example 1

Figure 14:
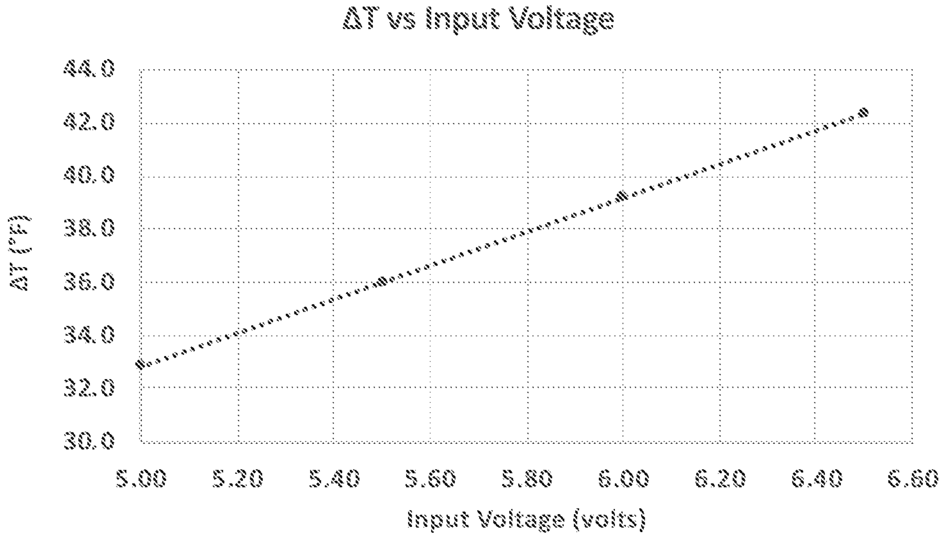
FIG. 14 shows a graphical plot illustrating a temperature differential as a function of the input voltage into a portable cooling device.

Turning now to FIG. 14 which shows a graphical representation of a temperature differential (y-axis; AT ° F.) between an external environment (i.e., outside of the portable cooling device) and an internal environment (i.e., in the portable cooling device) as a function of input voltage (V) (x-axis) into the portable cooling device. For example, using the portable cooling devices described herein and as shown in FIG. 14, an input voltage of 5V resulted in a temperature differential of 32.8° F. between the external environment and the internal environment; an input voltage of 5.5V resulted in a temperature differential of 36° F.; and an input voltage of 6V resulted in a temperature differential of 39.2° F. Taken together, increasing an input voltage increases an achievable temperature differential between an internal environment and an external environment.

Example 2

Further, Table 1 shown below depicts temperature accuracy measurements for competitor products versus the portable cooling devices shown and described herein. A BlueMaestro Tempo Disc Blue-Tooth Sensor Beacon thermometer was calibrated (i.e., temperature in various conditions was monitored over several days) and positioned inside each device to measure an actual temperature versus a temperature reported by the device (i.e., displayed temperature). As shown in Table 1, a displayed temperature and actual temperature are vastly different (by at least 14° F.) for the competitor product while the portable cooling devices described herein have a similar temperature between the displayed temperature and the actual temperature.

TABLE 1

Temperature Accuracy Measurements

| Device | Displayed Temp. (° F.) | Actual Temp. (° F.) | Delta Temp. (displayed vs. actual) |
|---|---|---|---|
| DISON BC-170A | 39 | 53.1 | 14.1 |
| Shenzenn HEALTH Cooler box | 37 | 47.1 | 10.1 |
| Suzhou GoMore | 42 | 51.6 | 9.6 |
| Portable Cooling Device | 31 | 34 | 3 |

As used in the description and claims, the singular form “a”, “an” and “the” include both singular and plural references unless the context clearly dictates otherwise. For example, the term “thermoelectric cooler” or “fan” may include, and is contemplated to include, a plurality of thermoelectric coolers or fans. At times, the claims and disclosure may include terms such as “a plurality,” “one or more,” or “at least one;” however, the absence of such terms is not intended to mean, and should not be interpreted to mean, that a plurality is not conceived.

The term “about” or “approximately,” when used before a numerical designation or range (e.g., to define a length or pressure), indicates approximations which may vary by (+) or (−) 5%, 1% or 0.1%. All numerical ranges provided herein are inclusive of the stated start and end numbers. The term “substantially” indicates mostly (i.e., greater than 50%) or essentially all of a device or system.

As used herein, the term “comprising” or “comprises” is intended to mean that the devices, systems, and methods include the recited elements, and may additionally include any other elements. “Consisting essentially of” shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. “Consisting of” shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term “invention” merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A portable cooling device comprising:

an inner housing comprising:

a probe configured to measure a temperature inside the inner housing, and a compartment fan positioned in the inner housing and configured to circulate cooled air in the inner housing;

a thermoelectric cooler comprising a first side and a second side opposite the first side, wherein the thermoelectric cooler is adjacent to the inner housing;

an exhaust fan in communication with an environment external to the portable cooling device, wherein the exhaust fan is configured to vent heat from the second side of the thermoelectric cooler to the environment;

an external temperature probe configured to measure a temperature of an external environment;

a processor coupled to a memory configured to store instructions; and a power source configured to vary a range of input voltages to vary a cooling capacity of the portable cooling device and achieve a desired temperature differential between an internal environment in the inner housing and the external environment, wherein a first input voltage results in a first temperature differential between the internal environment in the portable cooling device and the external environment and a second input voltage results in a second temperature differential between the internal environment and the external environment, wherein the instructions, when executed by the processor, cause the processor to:

compare the first temperature differential to the second temperature differential, and cause adjustment of the input voltage, based on the comparison, to achieve the desired temperature differential.

2. The portable cooling device of claim 1, further comprising an outer housing such that the inner housing is positioned within the outer housing, wherein insulation is positioned between the outer housing and the inner housing.

3. The portable cooling device of claim 1, wherein the compartment fan is oriented towards the inner housing, such that cooled air passes through the inner housing and then through one or more channels extending axially along a length of the inner housing, between the inner housing and an outer housing.

4. The portable cooling device of claim 1, wherein the exhaust fan is at least partially positioned in an outer housing, wherein the inner housing is positioned within the outer housing.

5. The portable cooling device of claim 1, further comprising one or more holders.

6. The portable cooling device of claim 5, wherein the one or more holders comprise a scale to measure a weight of a receptacle positioned therein.

7. The portable cooling device of claim 6, further comprising a display configured to indicate the weight of the receptacle positioned in the one or more holders.

8. The portable cooling device of claim 1, further comprising a display configured to indicate the temperature inside the inner housing, wherein an actual temperature in the inner housing is within about three degrees of a displayed temperature.

9. The portable cooling device of claim 1, further comprising a reserve power source for use when the power source is unavailable.

10. The portable cooling device of claim 1, further comprising a first heat sink adjacent to the compartment fan, a second heat sink adjacent to the exhaust fan, and a heat transfer block adjacent to the thermoelectric cooler, wherein the heat transfer block and the thermoelectric cooler are positioned between the compartment fan and the exhaust fan.

11. The portable cooling device of claim 1, further comprising a lid comprising one or more rails coupled thereto and defining a storage space therebetween, wherein the one or more rails extend substantially axially from the lid, and wherein the one or more rails extend axially into the inner housing when the lid is coupled to the portable cooling device.

12. The portable cooling device of claim 11, further comprising a plate coupled to the one or more rails on an end of the one or more rails opposite the lid.

13. The portable cooling device of claim 12, wherein the plate defines one more apertures that are configured to allow cooled air to pass from the compartment fan and into the storage space defined by the one or more rails.

14. The portable cooling device of claim 1, wherein each type of power source provides a different range of input voltages than each of other types of power sources.

15. The portable cooling device of claim 1, wherein adjustment of the input voltage, based on the comparison, is performed automatically by the processor.

16. A portable cooling device comprising:

an inner housing comprising:

a probe configured to measure a temperature inside the inner housing, and a compartment fan positioned in the inner housing and configured to circulate cooled air in the inner housing;

a thermoelectric cooler comprising a first side and a second side opposite the first side, wherein the thermoelectric cooler is adjacent to the inner housing;

an exhaust fan in communication with an environment external to the portable cooling device, wherein the exhaust fan is configured to vent heat from the second side of the thermoelectric cooler to the external environment;

an external temperature probe configured to measure a temperature of an external environment;

a processor coupled to a memory configured to store instructions;

a first power source comprising one of: a battery, a universal serial bus, a cigarette lighter receptacle, or a wall transformer; and a second power source, different from the first power source, comprising one of: a battery, a universal serial bus, a cigarette lighter receptacle, or a wall transformer;

wherein the first power source is configured to output a first range of input voltages to achieve a first desired temperature differential between an internal environment in the inner housing and the external environment, wherein the second power source is configured to output a second range of input voltages to achieve a second desired temperature differential between the internal environment in the inner housing and the external environment, and wherein the instructions, when executed by the processor, cause the processor to:

compare the first temperature differential to the second temperature differential, and adjust, based on the comparison, an input voltage or power source to achieve the desired temperature differential and maintain the temperature inside the inner housing.

17. The portable cooling device of claim 16, further comprising a lid comprising one or more rails coupled thereto and defining a storage space therebetween, wherein the one or more rails extend substantially axially from the lid, and wherein the one or more rails extend axially into the inner housing when the lid is coupled to the portable cooling device.

18. The portable cooling device of claim 17, further comprising a plate coupled to the one or more rails on an end of the one or more rails opposite the lid, wherein the plate defines one more apertures that are configured to allow cooled air to pass from the compartment fan and into the storage space defined by the one or more rails.

19. A portable cooling device comprising:

a probe configured to measure a temperature inside the portable cooling device;

a compartment fan configured to circulate cooled air in the portable cooling device;

a thermoelectric cooler comprising a first side and a second side opposite the first side;

an exhaust fan in communication with an external environment, wherein the exhaust fan is configured to vent heat from the second side of the thermoelectric cooler to the external environment;

an external temperature probe configured to measure a temperature of an external environment;

a processor coupled to a memory configured to store instructions;

a first power source; and a second power source, different from the first power source;

wherein the first power source is configured to output a first range of input voltages to achieve a first desired temperature differential between an internal environment in the portable cooling device and the external environment, wherein the second power source is configured to output a second range of input voltages to achieve a second temperature differential between the internal environment and the external environment, and wherein the instructions, when executed by the processor, cause the processor to:

compare the first temperature differential to the second temperature differential, and adjust, based on the comparison, an input voltage or power source to achieve the desired temperature differential and maintain the temperature inside the portable cooling device.

20. The portable cooling device of claim 19, further comprising a reserve power source for use when the first and second power sources are unavailable.

21. The portable cooling device of claim 19, further comprising a second thermoelectric cooler configured to increase the first or second temperature differential.

22. The portable cooling device of claim 19, further comprising: a lid removably coupled to an outer housing via a coupling mechanism, wherein the lid is configured to removably couple to the outer housing via a securing mechanism, and wherein the compartment fan is positioned in the lid.

* * * * *